US012684404B2

(12) United States Patent
Bae et al.

(10) Patent No.: US 12,684,404 B2
(45) Date of Patent: Jul. 14, 2026

(54) METHOD AND APPARATUS FOR SERVICE USING TETHERING IN WIRELESS COMMUNICATION SYSTEM

(71) Applicant: SAMSUNG ELECTRONICS CO., LTD., Suwon-si (KR)

(72) Inventors: Jaehyeon Bae, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/231,081

(22) Filed: Aug. 7, 2023

(65) Prior Publication Data

US 2024/0056869 A1 Feb. 15, 2024

(30) Foreign Application Priority Data

Aug. 9, 2022 (KR) ......................... 10-2022-0099341
May 30, 2023 (KR) ......................... 10-2023-0069378

(51) Int. Cl.
*H04W 28/02* (2009.01)
*H04W 28/10* (2009.01)
*H04W 28/24* (2009.01)

(52) U.S. Cl.
CPC ....... *H04W 28/0263* (2013.01); *H04W 28/10* (2013.01); *H04W 28/24* (2013.01)

(58) Field of Classification Search
CPC .. H04W 28/0263; H04W 28/10; H04W 28/24
See application file for complete search history.

(56) References Cited

U.S. PATENT DOCUMENTS

2017/0164386 A1    6/2017 Fu et al.
2020/0008101 A1*   1/2020 Kotecha .............. H04L 43/0894
2021/0144517 A1*   5/2021 Guim Bernat ........ G06F 9/5072
(Continued)

FOREIGN PATENT DOCUMENTS

KR    10-2022-0068021 A    5/2022
WO       2022083884 A1    4/2022

OTHER PUBLICATIONS

International Search Report and Written Opinion of the International Searching Authority dated Nov. 2, 2023, in connection with International Application No. PCT/KR2023/011573, 7 pages.
(Continued)

*Primary Examiner* — Melanie Jagannathan

(57) ABSTRACT

The disclosure relates to a 5G or 6G communication system for supporting a higher data transmission rate. According to an embodiment of the disclosure, a policy control function (PCF) entity in a wireless communication system comprises a transceiver and at least one processor. The at least one processor is configured to update a service-related policy based on a service transmission delay time (delay budget adjustment) per service flow, wherein the service transmission delay time per service flow is transmitted to a tethered device, schedule a quality-of-service (QoS) based on the service-related policy, and transmit, to a session management function (SMF) entity, a first message including the per-service flow service transmission delay time per service flow, the updated service-related policy, and a QoS requirement based on the scheduled QoS.

10 Claims, 13 Drawing Sheets

(56) References Cited

U.S. PATENT DOCUMENTS

| | | | | |
|---|---|---|---|---|
| 2021/0282049 A1* | 9/2021 | Sun | ....................... | H04M 15/66 |
| 2023/0053602 A1* | 2/2023 | Bonneville | ....... | H04W 28/0268 |
| 2023/0062526 A1* | 3/2023 | Xiong | ................. | H04W 72/543 |
| 2023/0308496 A1* | 9/2023 | Lee | ......................... | H04L 65/70 |
| 2025/0008370 A1* | 1/2025 | Sun | .................... | H04W 72/543 |
| 2025/0132938 A1* | 4/2025 | Iniesta Gonzalez | ......................... | |
| | | | | H04L 12/1407 |

OTHER PUBLICATIONS

3GPP TR 23.700-60 V0.3.0 (May 2022), Technical Report, 3rd Generation Partnership Project; Technical Specification Group Services and System Aspects; Study on XR (Extended Reality) and media services (Release 18), May 2022, 218 pages.

Nokia et al., "KI#1/#2 New Sol: Policy Control enhancements for multi-modal traffic", S2-2204609, 3GPP SA WG2 Meeting #151E, e-meeting, May 16-20, 2022, 6 pages.

Supplementary European Search Report dated Oct. 13, 2025, in connection with European Patent Application No. 23852912.7, 14 pages.

Samsung; "KI #2: New solution on multi-modality support among multiple UEs," SA WG2 Meeting #151E e-meeting; S2-2204118 (revision of S2-2202750r04); May 2022, 5 pages.

* cited by examiner

METHOD AND APPARATUS FOR SERVICE USING TETHERING IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2022-0099341 and 10-2023-0069378, which were filed in the Korean Intellectual Property Office on Aug. 9, 2022 and May 30, 2023, the entire disclosure of which is incorporated herein by reference.

BACKGROUND

1. Field

The disclosure relates to a communication method and apparatus for a service using tethering in a wireless communication system.

2. Description of Related Art 5G mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by ⅒.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

SUMMARY

The disclosure provides a method and apparatus for transferring data of a service using tethering to at least one UE using a service using tethering in a wireless communication system.

The disclosure provides a method and apparatus for transferring XR data within an allowable delay time considering a delay time for data transmission of at least one UE and at least one tethered device connected to the UE using the service using tethering in a wireless communication system.

The disclosure provides a method and apparatus for providing QoS information and policy information for at least one service flow for the same service using tethering in a wireless communication system.

According to an embodiment of the disclosure, a policy control function (PCF) entity in a wireless communication system comprises a transceiver and at least one processor. The at least one processor is configured to update a service-related policy based on a service transmission delay time (delay budget adjustment) per service flow, wherein the service transmission delay time per service flow is transmitted to a tethered device, schedule a quality-of-service (QoS) based on the service-related policy, and transmit, to a session management function (SMF) entity, a first message including the service transmission delay time per service flow, the updated service-related policy, and a QoS requirement based on the scheduled QoS.

According to an embodiment of the disclosure, a session management function (SMF) entity in a wireless communication system comprises a transceiver and at least one processor. The at least one processor is configured to receive, from a policy control function (PCF), a first message including a service transmission delay time per service flow, an updated service-related policy, and a quality-of-service (QoS) requirement, configure a QoS of a service flow to be transmitted to a tethered device based on the QoS requirement, and transmit a second message including the service transmission delay time per service flow to a radio access network (RAN) through an access and mobility function (AMF) entity based on the updated service-related policy.

According to an embodiment of the disclosure, a method by a policy control function (PCF) entity in a wireless communication system comprises updating a service-related policy based on a per-service flow service transmission delay time (delay budget adjustment) per service flow, wherein the service transmission delay time per service flow is transmitted to a tethered device, scheduling a quality-of-service (QoS) based on the service-related policy, and transmitting, to a session management function (SMF) entity, a first message including the service transmission delay time per service flow, the updated service-related policy, and a QoS requirement based on the scheduled QoS.

According to an embodiment of the disclosure, a method by a session management function (SMF) entity in a wireless communication system comprises receiving, from a PCF, a first message including a service transmission delay time per service flow, an updated service-related policy, and a quality-of-service (QoS) requirement, configuring a QoS of a service flow to be transmitted to a tethered device based on the QoS requirement, and transmitting a second message including the service transmission delay time per service flow to a radio access network (RAN) through an access and mobility function (AMF) entity based on the updated service-related policy.

According to an embodiment of the disclosure, a method performed by an application server for an XR service in a wireless communication system comprises allocating, to at least one UE, identification information for identifying at least one UE using the same XR service or at least one service flow for transferring XR data to each of the at least one UE, and providing the wireless communication system connected with the at least one UE with XR service-related information including a delay time for XR data transmission for the XR service constituted of a UE and one or more tethered devices connected to the UE and the identification information.

According to an embodiment of the disclosure, an application server for an XR service in a wireless communication system comprises a transceiver and a processor configured to allocate, to at least one UE, identification information for identifying at least one UE using the same XR service or at least one service flow for transferring XR data to each of the at least one UE, and provide the wireless communication system connected with the at least one UE with XR service-related information including information about a transmission delay time for data transmission to a UE and a tethered device connected to the UE and the identification information through the transceiver.

According to an embodiment of the disclosure, a method performed by a first network entity for an XR service in a wireless communication system comprises receiving policy information and QoS information related to the XR service provided from a second network entity managing policy information and QoS information in the wireless communication system and performing scheduling to transfer XR data to at least one UE and at least one tethered device connected to the UE using the same XR service within an allowable delay time considering a delay time for data transmission of a UE and a tethered device connected to the UE. The XR service-related information includes identification information for identifying at least one service flow for transferring XR data to the at least one UE or each of the at least one UE and at least one tethered device connected to the UE using the same XR service and information about a delay time for data transmission of the tethered device for the XR service.

According to an embodiment of the disclosure, a method performed by a first network entity for an XR service in a wireless communication system comprises a transceiver and a processor configured to receive, through the transceiver, policy information, and QoS information related to the XR service provided from a second network entity managing policy information and QoS information in the wireless communication system and perform scheduling to transfer XR data to at least one UE and at least one tethered device connected to the UE using the same XR service within an allowable delay time considering a delay time for data transmission of a tethered device. The XR service-related information includes identification information for identifying at least one service flow for transferring XR data to the at least one UE or each of the at least one UE and at least one tethered device connected to the UE using the same XR service and information about an allowable delay time considering for data transmission of the tethered device for the XR service.

According to an embodiment of the disclosure, an application function (AF) entity in a wireless communication system may comprise a transceiver and at least one processor. The at least one processor may be configured to determine a delay time of a service transmission to a tethered device based on service flow-related information and transmission delay time difference information between a UE and the tethered device connected to the UE and transmit a message including the service transmission delay time to an NEF.

The service flow-related information may include at least one of a generic public subscription identifier (GPSI) of the UE, an application identifier, an IP address, and an AF group identifier.

According to an embodiment of the disclosure, a policy control function (PCF) entity in a wireless communication system may comprise a transceiver and at least one processor. The at least one processor may be configured to receive information about a delay time of service transmission to a tethered device connected to a UE from an NEF and update the service-related policy based on the service transmission delay time.

Further, the service transmission delay time may be determined based on the service flow-related information and transmission delay time difference information between the UE and the tethered device connected to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1A:
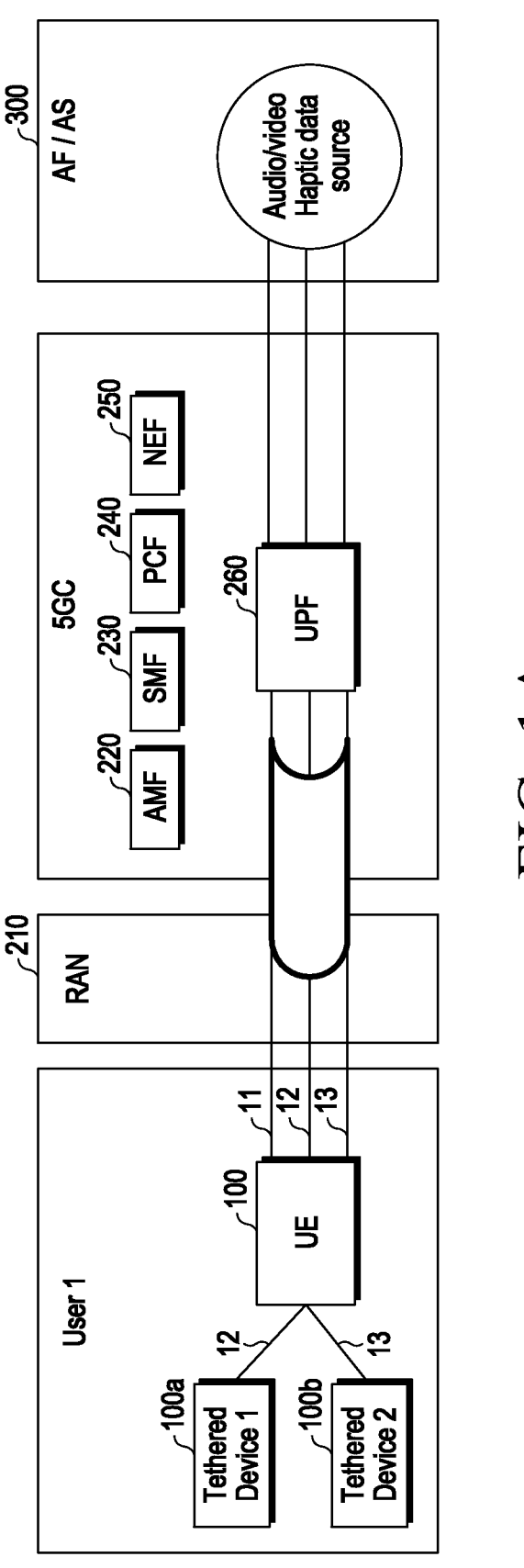
FIG. 1A illustrates an example service transmission path of a service using tethering in a wireless communication system according to an embodiment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. When determined to make the subject matter of the disclosure unclear, the details of the known functions or configurations may be skipped. The terms as used herein are defined considering the functions in the disclosure and may be replaced with other terms according to the intention or practice of the user or operator. Therefore, the terms should be defined based on the overall disclosure.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some embodiments, the functions mentioned in the blocks may occur in different orders. For example, two blocks that are consecutively shown may be performed substantially simultaneously or in a reverse order depending on corresponding functions.

As used herein, the term " . . . unit" means a software element or a hardware element. The ' . . . unit' plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments, a " . . . unit" may include one or more processors.

In the disclosure, the user equipment (UE) may refer to a terminal, MS (mobile station), cellular phone, smartphone, computer, or various electronic devices capable of performing communication functions.

The embodiments of the disclosure may also apply to other communication systems with similar technical backgrounds or channel forms. Further, embodiments of the disclosure may be modified in such a range as not to significantly depart from the scope of the disclosure under the determination by one of ordinary skill in the art and such modifications may be applicable to other communication systems.

In a specific description of embodiments of the disclosure, a communication system may use various wired or wireless communication systems, e.g., the new RAN (NR), which is the radio access network, and the packet core (5G system, or 5G core network, or next generation core (NG core)), which is the core network, according to the 5G communication standard of the 3GPP which is a radio communication standardization organization. Embodiments of the disclosure may also be applicable to communication systems with a similar technical background with minor changes without significantly departing from the scope of the disclosure, and this may be possible under the determination of those skilled in the art to which the disclosure pertains.

As used herein, terms for identifying access nodes, terms denoting network entities (NEs), terms denoting messages, terms denoting interfaces between network functions (NFs), and terms denoting various pieces of identification information are provided as an example for ease of description. Thus, the disclosure is not limited by the terms, and such terms may be replaced with other terms denoting objects with equivalent technical concepts.

The 5G system may support the network slice, and traffic for different network slices may be processed by different protocol data unit (PDU) sessions. The PDU session may mean an association between a data network providing a PDU connection service and a UE. The network slice may be understood as technology for logically configuring a network with a set of network functions (NF) to support various services with different characteristics, such as broadband communication services, massive IoT, V2X, or other mission critical services, and separating different network slices. Therefore, even when a communication failure occurs in one network slice, communication in other network slices is not affected, so that it is possible to provide a stable communication service. In the disclosure, the term "slice" may be interchangeably used interchangeably with "network slice". In such a network environment, the UE may access a plurality of network slices when receiving various services. Further, the network function (NF) may be a software instance running on hardware and be implemented as a virtualized function instantiated on a network element or an appropriate platform.

The mobile communication carrier may constitute the network slice and may allocate network resources suitable for a specific service for each network slice or for each set of network slices. A network resource may mean a network function (NF) or logical resource provided by the NF or radio resource allocation of a base station.

For example, a mobile communication carrier may configure network slice A for providing a mobile broadband service, network slice B for providing a vehicle communication service, and network slice C for providing an XR service as described below. In other words, the 5G network may efficiently provide a corresponding service to a UE through a specialized network slice suited for the characteristics of each service. In the 5G system, the network slice may be represented as single-network slice selection assistance information (S-NSSAI). The S-NSSAI may include a slice/service type (SST) value and a slice differentiator (SD) value. The SST may indicate the characteristics of the service supported by the network slice (e.g., enhanced mobile broadband (eMBB), IoT, ultra-reliability low latency communication (URLLC), V2X, XR service etc.). The SD may be a value used as an additional identifier for a specific service referred to as SST.

Examples of services requiring services (high data rate low latency (HDRLL) characterized by high data rate and low latency may include extended reality (XR) services, augmented reality (AR) services, virtual reality (VR) services, or cloud gaming services. The VR service is a service that provides a virtual environment implemented by a computer device by means of a VR headset or the like. The AR service is a service capable of combining a virtual environment with the real world based on location, geographical information, and the like. The XR service is a service that may not only combine a real environment and a virtual environment but also provide information, such as tactile, auditory, and olfactory senses, to the user, thereby increasing the user's sense of experience.

In particular, the XR/AR/VR service may use one or a plurality of devices to provide the service. For example, when providing audio, video, and haptic services to the user, the device providing audio, the device providing video, and the device providing haptics, which implement a sense of touch by applying vibration and motion, may differ from each other, and the devices are referred to as tethered devices. In this case, the XR/AR/VR data arriving at each device through the network is required to be transferred to the user within a time appropriate for the service to provide an XR/AR/VR service with high user experience. As such, the service according to an embodiment, to transfer different types of XR data to the user within a delay time appropriate for the XR service upon providing XR/AR/VR services (hereinafter, collectively referred to as XR service for convenience of description) is referred to as a multi-modality service. In the disclosure, the term "multi-modality service" is used for convenience of description, and other various terms may be used to denote transfer of one or more data to the user within a delay time appropriate for the service.

In the disclosure, although the multi-modality service is described based on the XR service for convenience of description in the embodiments of the disclosure, the disclosure may also apply to various data services requiring multiple devices to be harmonized to provide a service to one user, as well as the XR service. The XR service is an example of a service using tethering that may require connection of multiple tethered devices, and in the disclosure, the XR service, XR data, etc. are not limited to those related to XR, but include those for the tethered connection service and the data of the tethered connection service. Thus, it should be noted that embodiments of the disclosure are not limited to the XR service.

As such, depending on service scenarios, the XR device (s) for XR service each may directly access the 5G network to provide the service or the XR devices may connect to one UE to access the 5G network through, e.g., tethering, to provide the service.

According to the disclosure, when various types of XR service data, such as audio, video, or haptics, are transferred to the UE(s) used by the same user and tethered device(s) connected to the UE(s), the XR service data may be transmitted to the UE(s) at similar times to be transferred to the user within an allowable delay time considering the transmission delay time between UE and tethered device, enhancing the user's service experience.

Further, according to the disclosure, for scheduling considering the tethering transmission delay time while transferring various types of XR data to the UE(s) and one or more tethered devices connected to the UE(s) for use of the same XR service, QoS and policy information may be defined, and related QoS and policy information may be transferred to the NG-RAN and the UPF to seamlessly provide a multi-modality service.

FIG. 1A illustrates an example service transmission path of a service (e.g., an XR service) using tethering in a wireless communication system according to an embodiment.

FIG. 1A illustrates example transmission paths 11, 12, and 13 through which XR data according to an XR service is transferred from the application function (AF)/application server (AS) 300 through the UPF 260 and next generation-radio access network (NG-RAN) 210 to one UE 100 used by the user. The UE 100 may operate as tethered XR devices 110a and 110b that receive different types of XR data, such as audio data, video data, and haptic data.

Figure 1B:
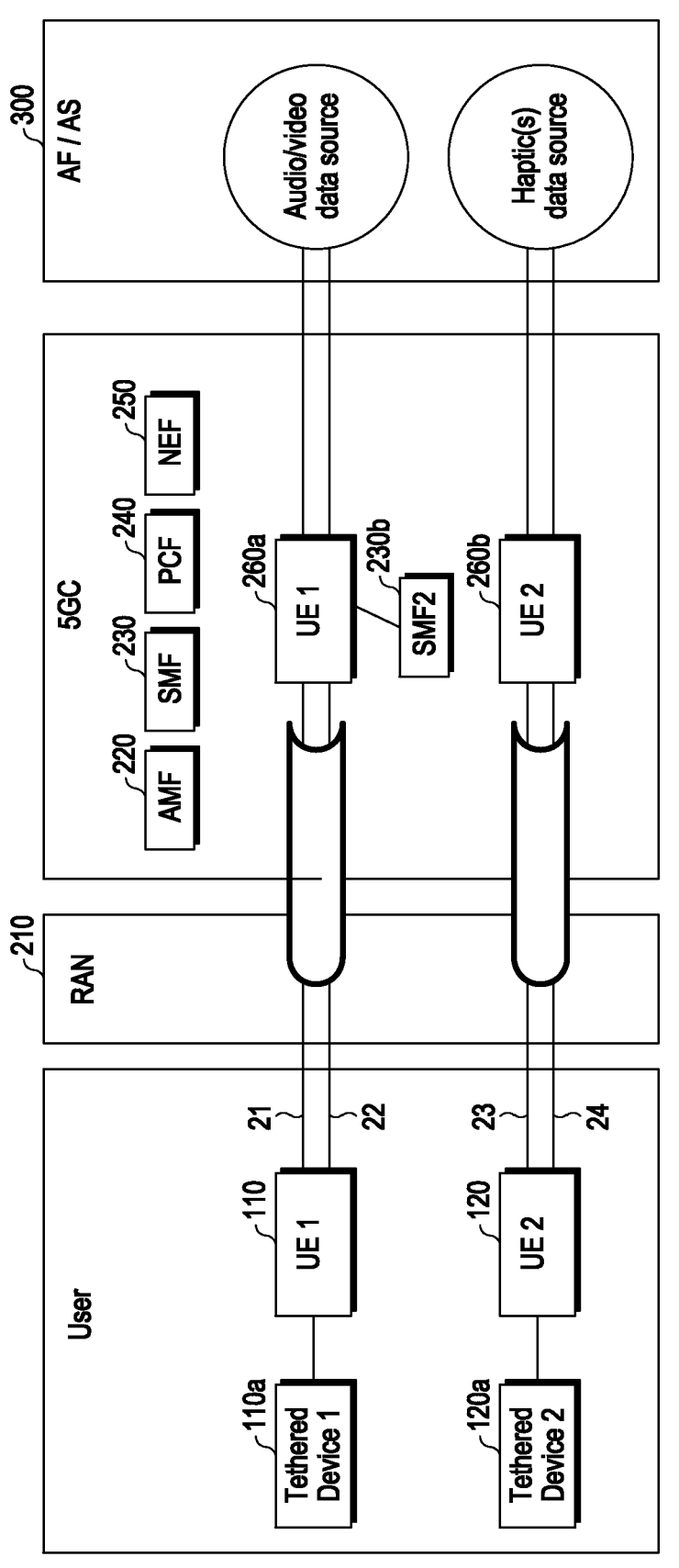
FIG. 1B illustrates an example service transmission path of a service using tethering in a wireless communication system according to an embodiment.

FIG. 1B is illustrates another example service transmission path of a service (e.g., an XR service) using tethering in a wireless communication system according to an embodiment.

FIG. 1B illustrates example transmission paths 21, 22, 23, and 24 through which XR data according to an XR service is transferred from the AF/AS 300 through the UPFs 260a and 260b and the NG-RAN (or RAN) 210 to a plurality of XR devices 110a and 120a connected with a plurality of UEs 110 and 120 used by one user. Each of the XR devices 110a and 120a tethered with the UEs 110 and 120 may receive different types of XR data, such as audio data, video data, or haptic data. The AF/AS 300 may be, e.g., an application server of an external network providing an XR service.

In the disclosure, the network technology may refer to the standards (e.g., TS 23.501, TS 23.502, TS 23.503, etc.) defined by the international telecommunication union (ITU) or 3GPP, and each of the components included in the network architecture of FIGS. 1A and 1B may mean a physical entity or may mean software that performs an individual function or hardware combined with software. Reference characters denoted by Nx in the drawings, such as N1, N2, N3, . . . , etc., indicate known interfaces between NFs in the 5G core network (CN), and the relevant descriptions may be found in the standard specifications (TS 23.501). Therefore, a detailed description will be omitted.

The wireless communication system shown in FIGS. 1A and 1B may include a radio access network (NG-RAN) and a 5G core network (5GC). The NG-RAN 210 may be a base station (e.g., gNB or integrated access and backhaul (IAB)) supporting radio access technology in the 5G system. The NG-RAN 210 may provide XR service-related information and/or data, transferred from the AF/AS 300 of the external network through the core network (i.e., 5GC), to the UE 100 connected to the tethered XR devices 100a and 100b or the UEs 110 and 120 including the tethered XR devices 110a and 120a. Further, the NG-RAN 210 may provide the AF/AS 300 with the XR service-related information and/or data received from the UE(s) 110, 120, or 100. As in the example of FIG. 1B, the UE (or XR device) may perform communication with the AF/AS 300 using technology using a sidelink, such as proximity service (Prose) for direct communication with another UE (or XR device) connected with the NG-RAN 210 without direct connection with the NG-RAN 210, or non-3GPP radio access technology, such as Wi-Fi or Bluetooth. In the following embodiments of the disclosure, the UE may be understood as a UE that is wirelessly or wiredly connected with one or more XR devices as in the example of FIG. 1B or performs communication via the 5G system between the XR device and the AS/AF as the UE(s) includes one or more XR devices as in the example of FIG. 1A.

In FIGS. 1A and 1B, the 5GC may include network entities, such as an access and mobility management function (AMF) 220, a session management function (SMF) 230, 230a, or 230b, a policy control function (PCF) 240, a network exposure function (NEF) 250, a user plane function (UPF) 260, 260a, or 260b, or a unified data management (UDM) (not shown).

The AMF 220 is an entity for managing access and mobility of the UE. The AMF 220 may serve as a UE-core network endpoint through which the UE connects with other entity(s) of the 5GC through the NG-RAN. As an example, the AMF 220 may perform such network functions as registration of the UE, connection, reachability, mobility management, access identification, authentication, and mobility event generation.

The SMF 230, 230a, or 230b may perform a management function for a protocol data unit (PDU) session of the UE. For example, the SMF 230, 230a, or 230b may perform such network functions as session management functions of establishing, modifying, or releasing a session and maintaining a tunnel between the UPF 260, 260a, or 260b and the NG-RAN 210, the functions of allocating and managing an Internet protocol (IP) address of the terminal, selection and control of the user plane, control of traffic processing on the UPF, and billing data gathering control.

The UPF 260, 260a, or 260b may serve to process the UE's user data (e.g., XR data) and may play a role to process XR data to transfer the XR data generated by the UE to the AF/AS 300 or transfer the data introduced from the AF/AS 300 to the UE. The UPF 260 may perform network functions, such as acting as an anchor between radio access technologies (RATs), providing connection with PDU sessions and the AF/AS 300, packet routing and forwarding, packet inspection, application of user plane policy, creating a traffic usage report, or buffering.

The UDM performs functions, such as generating authentication information for 3GPP security, processing the user ID, managing a list of network functions (NFs) supporting the UE, and managing subscription information. The unified data repository (UDR) may perform the functions of storing and providing subscription information managed by the UDM, structured data for exposure, and application data related to network exposure function (NEF) 250 or service.

The PCF 240 is an NF that manages operator policy information for providing a service in the 5G system. The UDR may store subscription information for the UE and may provide the UDM with the subscription information. Further, the UDR may store operator policy information and may provide operator policy information to the PCF. The NEF 250 may be responsible for transmitting or receiving an event occurring in the 5G system and a supported capability to/from the outside. For example, the NEF 250 may perform functions, such as safe supply of information about of the AF/AS 300 to the 5GC, conversion of internal/external information, and storing in the UDR and then redistributing the information received from other NFs.

The UE may access the NG-RAN 210 and register in the 5G system. For example, the UE may access the NG-RAN 210 to perform a UE registration procedure with the AMF 220. During the registration procedure, the AMF 220 may determine a network slice available to the UE accessing the NG-RAN 210 and allocate it to the UE. The UE may select a network slice and establish a PDU session for communication with the AF/AS 300. One PDU session may include one or more quality-of-service (QoS) flows, and each QoS flow may set different parameters to provide a different transmission performance required for each application service.

In the communication system as in the example of FIGS. 1A and 1, the XR data received by each UE 100, 110, and 120 and the XR devices including the tethered devices 100*a*, 100*b*, 110*a*, and 120*a* tethered to the UEs should be transferred to each XR device tethered to the UE within an allowable delay time considering the delay time of transmission to the tethered device 100*a*, 100*b*, 110*a*, and 120*a* for providing the XR service. Thus, the time required when the XR data from the AF/AS 300 is transferred to the UE including the XR device or connected to the XR device through the 5G system should be within an allowable range including the delay time of transmission to the tethered device. For example, when the user of the XR device touches an object in the virtual space, the heard sound, touch, and image should be transferred to the UE within the allowable delay time including the delay time of transmission to the tethered device and be transferred to the XR device wiredly/wirelessly connected with the UE or included in the UE to enable a multi-modality service according to an embodiment.

To that end, according to embodiments of the disclosure, there is described a scheme for providing the network with QoS and policy for transmitting XR data to enable a service for enhancing the user experience for an XR service, i.e., a multi-modality service, by controlling the time taken for the XR data for providing the XR service to the user to be transferred to each XR device directly/indirectly connected through the 5G system to fall within an allowable delay time including the delay time of transmission between tethered devices.

Further, although embodiments of the disclosure are described in light of the downlink to receive XR data by at least one UE, the schemes proposed in the disclosure may be applicable in an identical/similar manner to the uplink to transmit XR data by at least one UE.

Referring to FIG. 1A, it is assumed as an example that the same user uses one UE 100 connected to the XR device or including the XR device for XR service and that the UE 100 receives video, audio, and haptic data 11, 12, and 13 as XR data through the transmission path that passes from the AF/AS 300 through the UPF 260. The XR data is data for providing the same XR service. The disclosure proposes policy information and/or quality-of-service information for a service flow(s) for transmission of XR data considering a transmission delay time difference (hereinafter, 'delay budget difference adjustment') between XR UE and tethered XR device connected to the UE using at least one of tethering connection information (Bluetooth or Wi-Fi) about a tethered device connected to a UE or measuring the transmission delay time between the XR UE and the tethered device connected to the UE by the UE to provide the same XR service and proposes various procedures for providing an XR service by signaling the proposed information between the AF/AS 300 and the 5G system or between the network entities of the 5G system. In the 5GC of FIG. 1A, the SMF 230 may perform session management for maintaining a tunnel between the UPF 260 transferring the XR data and the NG-RAN 210, and the PCF 240 may provide QoS information and/or policy information considering the tethered device transmission delay time (delay budget adjustment) related to transmission of the XR data.

In the disclosure, as the information for identifying the XR data, at least one (hereinafter, AF specific service flow (SF) group ID) of, e.g., the XR application ID for providing the XR service or the XR application function (AF) ID of the AF/AS 300, the user ID indicating the user to be served by the UE on the application for the XR service, or the AF specific SF group ID indicating the group of the UEs (or XR devices) receiving the XR service and/or the group of the service flows related to the XR service may be used. Further, as the UE ID indicating the UE, the UE's IP address, or the generic public subscription identifier (GPSI) allocated to the UE or AF specific GPSI is required, and at least one of the PDU session ID of the PDU session for transferring the XR data in the 5G system and the XR dedicated QoS flow identification (QFI) for identifying the QoS flow related to the XR service may be used in the embodiments of the disclosure. In the embodiments of the disclosure, the XR service may be assumed to be allocated separate QoS flows to support high data rate (eMBB), ultra low-latency (URLLC) services.

Further, in addition to the information (e.g., AF specific SF group ID) for identifying the XR data related to the same XR service, an application data unit (ADU) identifier or an ADU sequence number may be used to indicate the unit of XR data at the application level or media level.

Further, in describing the embodiments of the disclosure, unless mentioned otherwise, the XR application ID, XR AF ID, application ID, and AF ID may be used to indicate the application, application service, or AF related to the XR service. Further, unless mentioned otherwise, the user ID and the AF specific SF group ID may be used to identify the UEs used by the user or the same XR service. In other words, in the embodiments of the disclosure, the AF specific SF group ID may be used to identify the group of XR service flows related to the same XR service (or group of a plurality of XR data) or to identify one or more UEs (or XR devices) related to the same XR service. Further, the UE ID, SUPI, GPSI, AF specific GPSI, and UE IP address, which are used to indicate the UE, may be used for the same purpose unless mentioned otherwise.

Hereinafter, referring to FIGS. 2 and 3, various methods for transferring at least one XR data for an XR service which is one service using tethering to the UE and one or more tethered devices connected to the UE of the same user within an allowable delay time considering the difference (delay budget difference adjustment) due to the transmission delay between the service flow of the UE and the service flow of the tethered device are described. As such, in a case where the UE has an XR device connected to one or more tethered devices, when each XR data is received within an allowable delay time considering the difference (delay budget difference adjustment) due to a transmission delay between service flows when at least one XR data is transmitted to the tethered device for the same XR service, the user's experience for the XR service may be enhanced, so that it is possible to stably provide an XR service. To that end, QoS request information and/or policy information for XR service flows of at least one tethered device connected to the UE may be provided from the AF/AS through the PCF or SMF to the UPF and NG-RAN (hereinafter, 'RAN') transferring the at least one XR data. The QoS request information and/or policy information may include information indicating the difference (delay budget difference adjustment) due to the transmission delay between the UE and tethered device service flows. The delay time information that occurs when transmitting at least one XR service flow (or at least one XR data) transmitted to the tethered device for the same XR service may be provided as delay budget difference adjustment and delay budget adjustment as described above. For a basic description of the network entities (SMF, PCF, NEF, etc.) operating in the embodiments of FIGS. 2 and 3, the foregoing description made in connection with FIG. 1B may be referenced. For a basic description of messages transmitted/received between network entities in the embodiments of FIGS. 2 to 3, 3GPP NR standards (e.g., TS 23.501, TS 23.502, TS 23.503, etc.) may be referenced.

Figure 2:
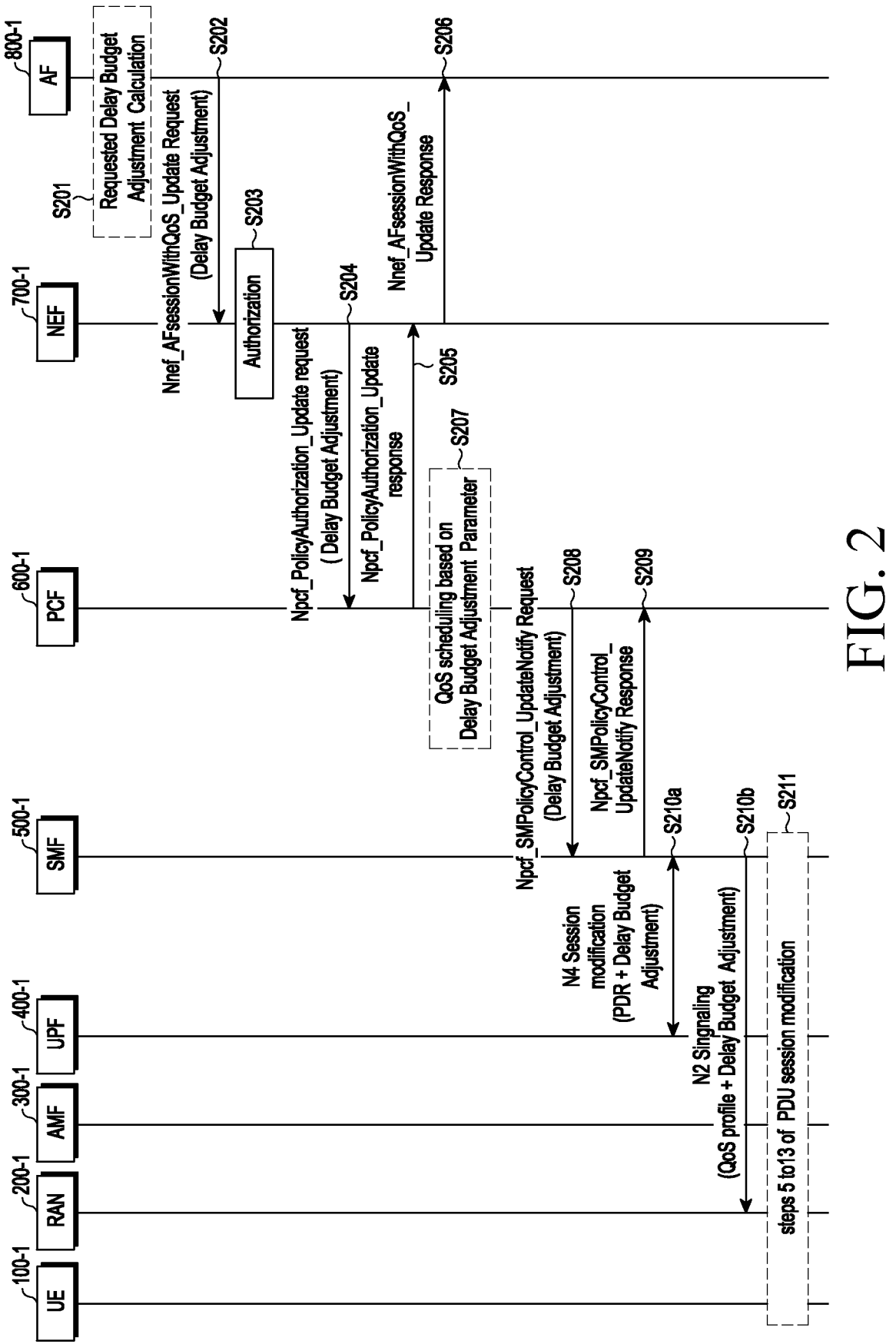
FIGS. 2 and 3 illustrate a scheduling method for a multi-modality service in a wireless communication system according to an embodiment.
Figure 3:
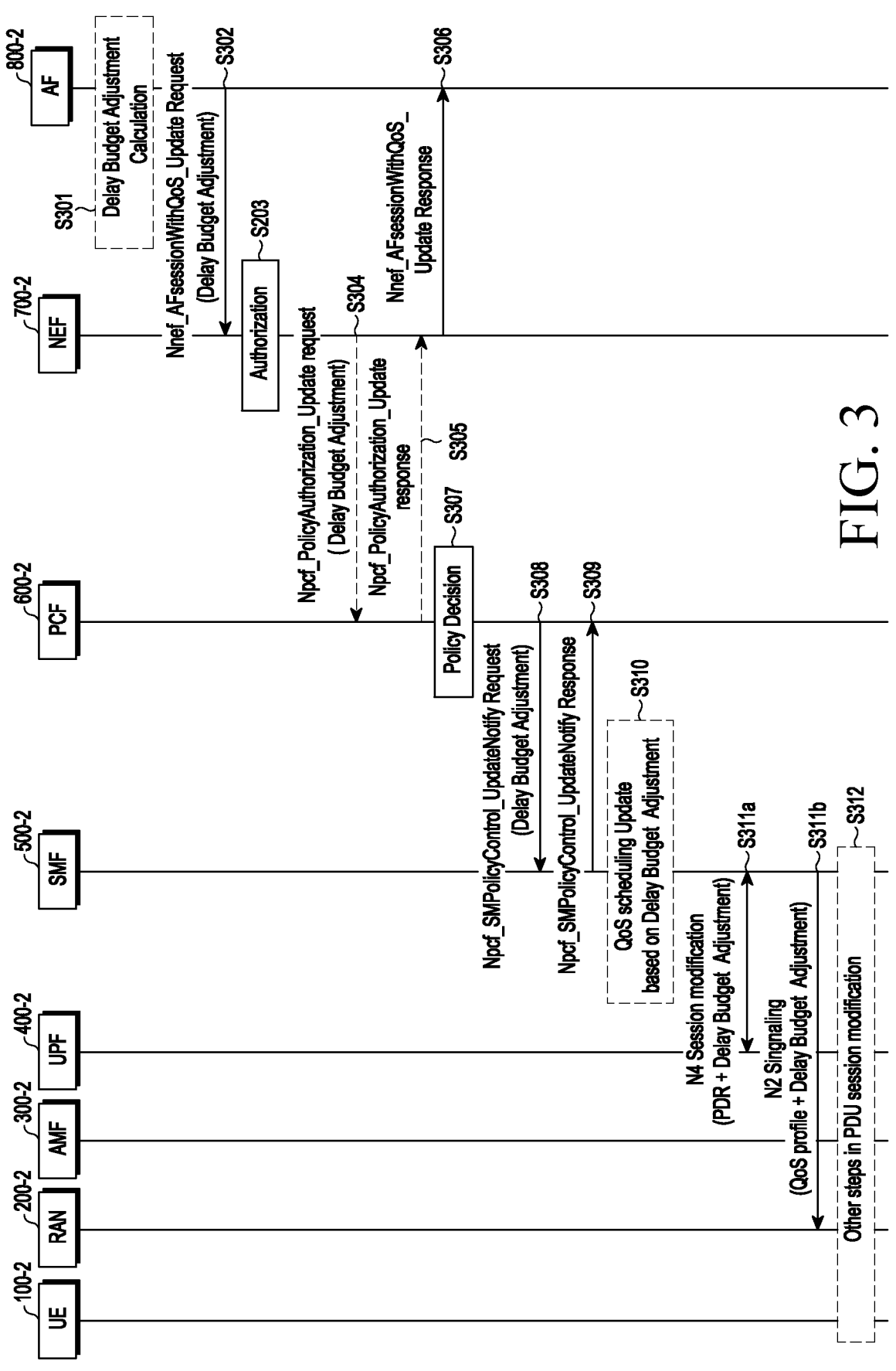

FIGS. 2 and 3 illustrate a method for transferring XR data for an XR service in a wireless communication system according to an embodiment. The embodiment of FIGS. 2 and 3 is a specific example in which XR service-related information is transferred from the AF/AS through the PCF to the UPF and NG-RAN and QoS for multi-modality service using tethered devices applies. The example of FIGS. 2 and 3 is a procedure in which a plurality of XR data for the same XR service are transmitted to the tethered device considering the transmission delay time between the user's UE and at least one tethered device connected to the UE from the AF/AS, and each XR data is transferred within the allowable delay time.

Referring to FIGS. 2 and 3, the case of using the XR service through one user's UE (UE) is considered. In the example of FIGS. 2 and 3, the UE may be a UE including an XR device or connected to an XR device.

Although not shown in FIGS. 2 and 3, in step S200 before step S201 in FIG. 2 or step S300 before step S301 in FIG. 3, basic settings for using the XR service between the UE and the 5G system may be made. For example, it is assumed that an XR-dedicated S-NSSAI which is the identifier of the dedicated network slice for the XR service is configured in the UE and/or network. In this case, the XR dedicated S-NSSAI may include an SST for XR service or an SST for XR service provided by the communication operator. Additionally, the XR dedicated S-NSSAI may include a slice differentiator (SD) for identifying a specific XR service or a specific XR service application. The UE may transfer at least one of information about GPSI, application ID, IP address, service flow group ID, and delay budget difference adjustment (transmission delay time difference) of the UE to the DN (AS or AF).

Further, the subscription information about the UE may include the XR-dedicated S-NSSAI corresponding to the XR service, which may be received by the UE through the network, or may include the AF/AS ID, which is the ID of the AF/AS providing the XR service to the UE or application ID and or the AF-specific GPSI or GPSI which is an ID for defining the UE by the AF/AS. Further, when a group of UEs (or XR devices) to together receive the XR service is predetermined, the AF specific SF group ID for defining the group or user ID or pairing information may be included in the subscription information. As such, when the subscription information includes the AF specific SF group ID, the procedure for configuring the AF specific SF group between the AF/AS and the UE (e.g., UE1 or UE2) and the procedure for providing the 5G system with the AF specific SF group ID, which is information indicating the configured group, or user ID or pairing information may be omitted and, the information may be updated by the network.

The UE for receiving the XR service may access the AF/AS providing the XR service and, in this case, the UE may access the AF/AS through the 5G system or Wi-Fi. Various communication schemes may be used for the UE to access the AF/AS. The UE connected to the AF/AS may transfer information related to the XR device connected to the UE. The information may be an actually measured transmission delay value that occurs during XR transmission between the UE and the XR device connected thereto or the XR service-related information may be transferred through a tethering profile (information such as tethered device connection type or codec) of the tethered device. The tethering profile information about the tethered device may include a tethered service flow indication and tethered device service flow ID. The AF/AS may identify the tethered device service flow based on the corresponding information or may use an average delay information value based on information about the tethering profile defined by the XR service operator.

For example, when the connection between the tethered device and the UE using the XR service is made via Bluetooth connection, and the UE does not provide separate connected tethered device delay time information to the AF/AS, if corresponding service flow transmission provides an XR service using an apt X LL compression algorithm, the AF/AS may assume the tethering transmission delay time of the service flow as 34 ms based on the tethering profile received through the UE and use it when scheduling tethered device XR data.

Further, transmission delay time information between the UE and the tethered device connected thereto during XR service may be fixedly set based on measurement upon initial connection or a designated tethering transmission delay time, or the transmission delay time between the UE and the tethered device may be remeasured periodically or aperiodically according to, e.g., a change in the user's environment or the user's request, and the updated information may be transferred to the AF/AS.

For example, as the transmission delay time value between the UE and the tethered device is changed due to, e.g., a change in the user's environment while the service user uses the XR service considering the initial tethering transmission delay time using the XR UE and tethering XR UE, if a difference in service flow (e.g., audio/video perception mismatch) occurs between the UE and the tethered device when using the service, the user remeasures the transmission delay time between the UE and the tethered device according to the user's request and transfers the corresponding XR service requirement to the AF/AS, performing QoS scheduling of service flow.

When a multi-modality service according to the disclosure is supported, the XR service-related information may include a value of the tethering transmission delay time difference (delay budget difference adjustment) that occurs when data of each service flow is transferred to the UE and the tethered device connected to the UE and processed. Further, the UE ID, e.g., the SUPI or GPSI or AF-specific GPSI or UE IP address, may be included in the XR service-related information to identify the UE(s) correspond to (belonging to) the AF specific SF group ID while providing the XR service-related information and the AF specific SF group ID (e.g., multi-modality service ID) from the AF/AS to the 5G system. Further, the XR service-related information may be provided from the 5G system to the corresponding UE.

The XR service-related information may also be referred to as "multi-modality service-related information."

The XR service-related information may be provided to the NEF of the 5G system by the AF/AS and be transferred from the NEF to the PCF. The XR service-related information transferred from the AF/AS may include a plurality of parameters for QoS and scheduling, and all or some of the plurality of parameters may be allowed and applied, as they are, in the 5G system or be changed and applied. Therefore, when at least some of the parameters of the XR service-related information transferred from the AF/AS to the NEF are changed in the 5G system, the XR service-related information transferred from the PCF to the SMF, UPF, and NG-RAN may be applied in the UPF and the NG-RAN. As such, the XR service-related information transferred from the AF/AS to the NEF and the XR service-related information transferred from the PCF to the SMF, UPF, and NG-RAN may be divided. However, they are collectively referred to as XR service-related information for convenience of description in the embodiments of the disclosure.

Further, in the disclosure, the information (hereinafter, "service flow detection information) for detecting a service flow(s) by the UPF and the SMF may include at least one of the AF/AS ID, the source ID address and port information about the AF/AS, the sequence number (SN), or the ID of the ADU which is application level packet information. The service flow detection information may be transfer from the AF/AS to the PCF through the NEF and be transfer to the UPF via the PCF and the SMF. The SMF may transfer updated QER (QoS enforcement rules) to the UPF.

In an embodiment of the disclosure, when calculating the delay budget adjustment (DBA) of service flow to the tethered device of the UE, the DBA may be determined to have a value smaller than the service flow from the network to the UE minus the delay time packet delay budget (PDB) from the UE to the tethered device.

Referring to FIG. 2, in S201, the AF 800-1 may calculate the transmission delay time (delay budget adjustment) of the service flow transmitted to the tethered device based on information (GPSI, application ID, AF specific group ID (e.g., multi-modality service ID) for identifying the service flow(s) transmitted to the tethered device received in S200 (not shown) and the tethering transmission delay time difference (delay budget difference adjustment) or per-service flow tethering transmission delay time (tethered (device) delay budget per service flow) information.

In an embodiment, when calculating the tethering transmission delay time information using statistical characteristic values by measuring the corresponding tethered device, the tethering transmission delay time information may be expressed as tethering transmission delay time difference (delay budget difference adjustment) that means an additional time difference occurring due to transmission from the UE to the tethered device or as per-service flow tethering transmission delay time according to the service operator's policy. In an embodiment, when a predefined network type or service characteristic (e.g., codec type) is transmitted to the AF without measuring the transmission delay time from the UE to the tethered device, and the transmission delay time is mapped due to tethering based on the defined value, tethering transmission delay time information may be transmitted per service flow.

In an embodiment, the AF 800-1 may calculate the per-service flow service transmission delay time packet delay budget (PDB) considering the delay time difference between service flows per service flow configured with the same group ID as the multi-modality service ID based on the tethered device transmission delay time information. The calculated transmission delay time may be expressed as service flow transmission delay time information about one or more tethered devices depending on the number of tethered devices connected to the UE per UE.

Thereafter, in step S202, the AF 800-1 may transfer, to the NEF 700-1, an AF session service operation generation (Nnef_AFsessionWithQoS_Create) or update (Nnef_AFsessionWithQoS_Update) request message including the service flow ID information and transmission delay time-related tethered device connection service (e.g., XR service)-related QoS requirement information.

A policy authorization service generation (e.g., Npcf_PolicyAuthorization_Create) or update (e.g., Npcf_PolicyAuthorization_Update) request message including tethered device connection service (e.g., XR service)-related QoS requirement information including tethered device ID information and per-service flow transmission delay information about the tethered device received from the AF 800-1 through S203 and S204 may be transferred to the PCF 600-1. In S205 and S206, the XR service-related update request-related response information of the AF 800-1 received in S204 is transferred to the AF 800-1 through the NEF 700-1. In an embodiment, a reliable AF 800-1 may transfer tethered device connection service (e.g., XR service)-related QoS requirement information to the PCF 600-1 directly without passing through the NEF 700-1.

In S207, the PCF 600-1 may update the corresponding service flow-related policy and charging control rule (PCC rule) based on tethered device connection service (e.g., XR service)-related QoS requirement information including the per-service flow transmission delay time (delay budget adjustment) to be transmitted to the tethered device(s) received from the AF 800-1. Basically, default policy and charging control rule (PCC rule) per service flow may be generated based on XR service-related information per XR service flow transmitted to the UE 100-1.

In an embodiment, when the updated packet delay (PDB) value of the service flow to be transmitted to the tethered device based on XR service-related update information considering the tethered device requested by the AF 800-1 in the PCF 600-1 has a standard 5QI characteristic value, the 5QI value of the corresponding service flow may be changed into a 5QI value that has a matching QoS characteristic value, and QoS scheduling may be performed.

For example, in an XR service in which the UE is constituted of one or more tethered devices as shown in FIG. 1A, the default per-service flow policy and charging control rule may be updated based on the XR service-related QoS update request information including the transmission delay time-related information (delay budget difference adjustment) per tethered device in the UE in the AF, and QoS scheduling may be performed. As shown in FIG. 1A, the packet delay budget (PDB) values indicating the maximum times that may allow the default delay of service flow 1 (11 of FIG. 1A) and service flow 2 (12 of FIG. 1A) of the default XR service that does not consider the tethering transmission delay time are 150 ms and 100 ms, and based on the corresponding PDB values, the 5QI value for each service flow may be set to 1 and 2, respectively, referring to Table 1 below. In this case, when the transmission delay time of the tethered device of service flow 2 transmitted to the modality support of grouped service flows bundled into the same service on the application, such as the video service flow connected to the corresponding audio service flow while simultaneously changing the delay value of the audio service flow for tethered device connection.

In this case, in an embodiment, the AF 800-1 may adjust the PDB value of the service flow that is not transmitted to the tethered device according to the transmission delay time of the tethered device when adjusting the per-service flow delay value based on the tethered device transmission delay time. The PCF 600-1 may determine whether to perform QoS update based on the updated PDB requirement and change for each service flow according to the transmission delay time of the tethered device transferred from the AF 800-1 as described above. The tethering transmission delay time value may include at least one of the delay adjustment value of the service flow considering the tethered device, the tethered transmission delay time, and the delay time difference value considering an allowable delay time difference in service flow between the tethered device and non-tethering service flow grouped with the tethered device and serviced.

TABLE 1

| | Standardized 5QI to QoS characteristics mapping example | | | | | | |
|---|---|---|---|---|---|---|---|
| 5QI Value | Resource Type | Default Priority Level | Packet Delay Budget (NOTE 3) | Packet Error Rate | Default Maximum Data Burst Volume | Default Averaging Window | Example Services |
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]). Electricity distribution-medium voltage, Process automation monitoring | tethered device based on the XR service-related QoS update request information of the AF is transferred to the PCF as 50 ms, the PCF may QoS-schedule the PDB value of service flow 2 considering the tethered device as 50 ms considering the XR service update request information. When it is determined to perform PCC rule update using the standardized 5QI value, the 5QI value of service flow 2 of the tethered device may be changed from 2 to 3 by referring to Table 1 below, and the policy and charging control rule of service flow 2 may be updated. In an embodiment, when the additional tethered device transmission delay time is expected to be larger than that of the existing service QoS when tethered device connection is considered (e.g., when the additional tethering delay time connected to the inter-active audio service flow is 100 ms), it may be required to change the delay value of the video service flow for multi- Thereafter, in S208, the PCF 600-1 may transfer, to the SMF 500-1, a session management policy control update notification (Npcf_SMPolicycontrol_UpdateNotify) request message including the XR service-related per-service flow policy and charging control rule updated based on the XR service requirement in S207 through the SM policy association modification process. In S209, the SMIF 500-1 may transmit a session management policy control update notification (Npcf_SMPolicycontrol_UpdateNotify) service operation response message to the PCF 600-1. In S210 (S210*a* and S210*b*), the SMF 500-1 may receive the tethered device connection service (e.g., XR service)-related QoS requirement and default per-service flow policy and charging control rule received from the PCF 600-1, allocate a corresponding QFI to each service flow, and transfer service flow detection information and XR service-related information and/or forwarding information to the UPF and RAN (or NG-RAN) 200-1 for each QFI. The forwarding information may be information used in the process of transferring (forwarding) XR service flow data from each UPF 400-1 to the RAN 200-1.

The SMF 500-1 receiving the service flow detection information and the XR service-related information in S210a detects the ID of the QoS flow of the service flow based on the updated policy and charging control rule received in S208, and transfers information to be applied to the corresponding QoS flow to the UPF 400-1 through an N4 session establishment or modification process. Therefore, the information transferred to the UPF 400-1 may include at least one of QoS flow ID (QFI) for the XR service flow and information for detecting the same, e.g., AF ID or application ID or AF/AS address information, i.e., IP address and port information or application level packet information, i.e., ADU ID or sequence number (SN). Further, the information transferred to the UPF 400-1 in S210a may include at least one of an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S210b, the SMF 500-1 may include at least one piece of SM policy information in the N2 SM message container and transfer it to the RAN 200-1.

QFI of service flow,
AF ID
Application ID
AF specific SF Group ID
Tethered device transmission delay time value (delay budget adjustment) when multi-modality service using a tethered device is applied In an embodiment, in S210b, the SMF 500-1 may transfer, to the AMF 300-1, at least one of the QFI of service flow, AF ID, application ID, AF specific SF group ID (e.g., multi-modality service ID), and time-sensitive communication assistance information (TSCAI) including information such as tethered device transmission delay time value (delay budget adjustment) when multi-modality service using tethered device is applied through an N1N2 message transfer (Namf_Communication_N1N2Message Transfer) service operation message. The AMF 300-1 may transfer the TSCAI and QFI, including information such as the tethered device transmission delay time value (delay budget adjustment) received from the SMF 500-1, to the RAN 200-1 using an N2 SM message.

Referring to FIG. 3, in S301, the AF 800-2 may calculate the per-service flow transmission delay times (delay budget adjustment) transmitted to the tethered device based on information (GPSI, application ID, AF specific group ID (e.g., multi-modality service ID) for identifying the service flow(s) transmitted to the tethered device received in S300 (not shown) and the tethering transmission delay time difference (delay budget difference adjustment) information or per-service flow tethered device transmission delay time information including tethered device connection information such as the connection type and codec information of the tethering section.

The calculated transmission delay time may be expressed as per-service flow transmission delay time information about one or more tethered devices depending on the number of tethered devices connected to the UE per UE. Thereafter, in S302, the AF 800-2 may transfer, to the NEF 700-2, an AF session service operation generation (Nnef_AFsessionWithQoS_Create) or update (Nnef_AFsessionWithQo-S_Update) request message including the service flow ID information and tethered device connection service (e.g., XR service)-related QoS requirement information including the per-service flow transmission delay information of the tethered device.

A policy authorization service generation (e.g., Npcf_PolicyAuthorization_Create) or update (e.g., Npcf_PolicyAuthorization_Update) request message including tethered device connection service (e.g., XR service)-related QoS requirement information including tethered device ID information and per-service flow transmission delay information about the tethered device, including the GPSI, application ID, AF specific group ID (e.g., multi-modality service ID) received from the AF 800-2 through S303 and S304 may be transferred to the PCF 600-2. In S305 and S306, tethered device connection service-related update request-related response information of the received AF 800-2 may be transferred to the AF 800-2 through the NEF 700-2. In an embodiment, a reliable AF 800-2 may transfer tethered device connection service (e.g., XR service)-related QoS requirement information to the PCF 600-2 directly without passing through the NEF 700-2.

In S307, the PCF 600-2 may determine the corresponding service flow-related policy information update (PCC rule update) based on tethered device connection service (e.g., XR service)-related QoS requirement information including the per-service flow transmission delay time (delay budget adjustment) to be transmitted to the tethered device(s) received from the AF 800-2. If the requirement considering the corresponding tethered device may be met based on the QoS of the current default service flows even when considering the per-service flow transmission delay time information about the tethered device(s) received from the AF 800-1 according to a preset policy of the service operator or the network, the PCF 600-2 may perform PCC rule update including the per-service flow transmission delay time information considering the corresponding tethered device without performing separate QoS update.

Thereafter, in S308, the PCF 600-2 may transfer, to the SMF 500-2, PCC rule update information including per-service flow QoS update information based on the tethered device connection service requirement considering the tethered device requested by the AF, the XR service default policy and charging control rule (default PCC rule) of each service flow, based on the per-service flow XR service-related information basically transmitted to the UE through an SM policy association modification process, using a session management policy control update notification service operation (Npcf_SMPolicycontrol_UpdateNotify) request message. Further, in S309, a message responsive thereto may be transferred from the SMF 500-2 to the PCF 600-2.

If it is determined in S307 that the PCF 600-2 may meet the service requirement considering tethered device connection with the per-service flow default QoS information, it may be determined to update the PCC rule including the default QFI and QoS profile and additionally the per-service flow tethered device transmission delay information considering the tethered device.

In S310, the SMF 500-2 may receive the service-related default policy and charging control rule and tethered device connection service-related information including the tethering transmission delay time information and information (GPSI, application ID, AF specific group ID (e.g., multi-modality service ID)) for identifying the service flow(s) transmitted to the tethered device received in S308 and receive the corresponding service flow-related update policy information and transfer the QoS scheduling information to the RAN 200-2 and the UPF 400-2.

In S311 (S311*a* and S311*b*), the SMF 500-2 may receive the tethered device connection service (e.g., XR service)-related QoS requirement and per-service flow policy and charging control rule received from the PCF 600-2, allocate a corresponding QFI to each service flow, and transfer service flow detection information and XR service-related information and/or tethered device connection service-related information to the UPF 400-2 and RAN (or NG-RAN) 200-2 for each QFI.

The SMF 500-2 receiving the service flow detection information and the tethered device connection service-related information in S311*a* may detect the ID of the QoS flow of the service flow based on the policy and charging control rule updated in S307 in S310, and transfer information to be applied to the corresponding QoS flow to the UPF 400-2 through an N4 session establishment or modification process. Therefore, the information transferred to the UPF 400-2 may include, e.g., QoS flow ID (QFI) for the service flow considering tethered device connection and information for detecting the same, e.g., AF ID or application ID or AF/AS address information, i.e., IP address and port information or application level packet information, i.e., ADU ID or a sequence number (SN). Further, the information transferred to the UPF 400-2 in S311*a* may include at least one of an indicator indicating whether to apply multi-modality service to the service flow considering tethered device connection, a difference value of the delay time allowed when the multi-modality service is applied, and information such as the tethering transmission delay time (delay budget adjustment) in the environment where tethered device connection is used.

Thereafter, in S311*b*, the SMF 500-2 may include at least one of the following information as the SM policy information in the N2 SM message container and transfer it to the RAN 200-2.

QFI of service flow

AF ID,

Application ID,

AF specific SF Group ID (e.g., Multi-modal Service ID), or

Figure 4:
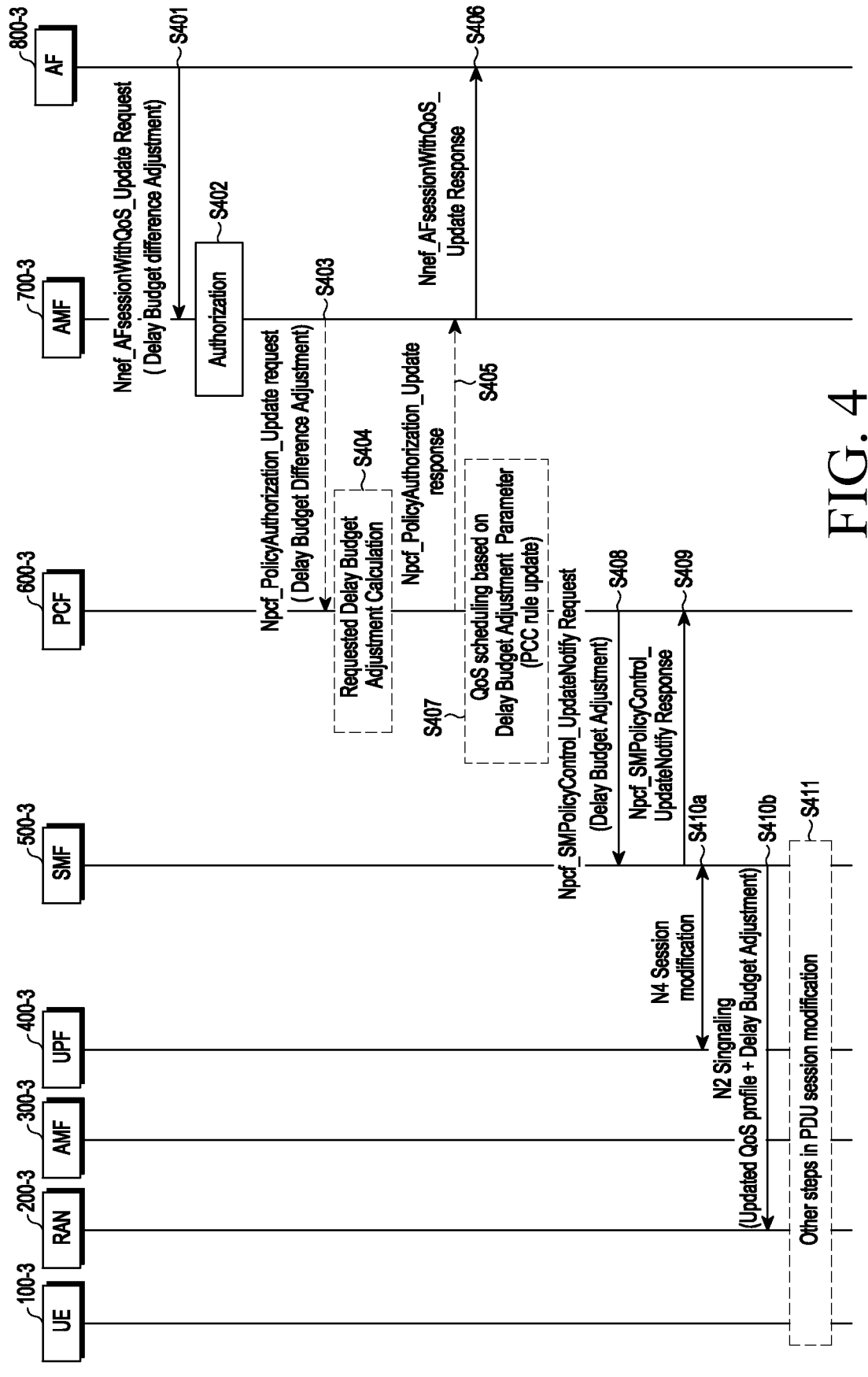
FIGS. 4 and 5 illustrate a scheduling method for a multi-modality service in a wireless communication system according to an embodiment.
Figure 5:
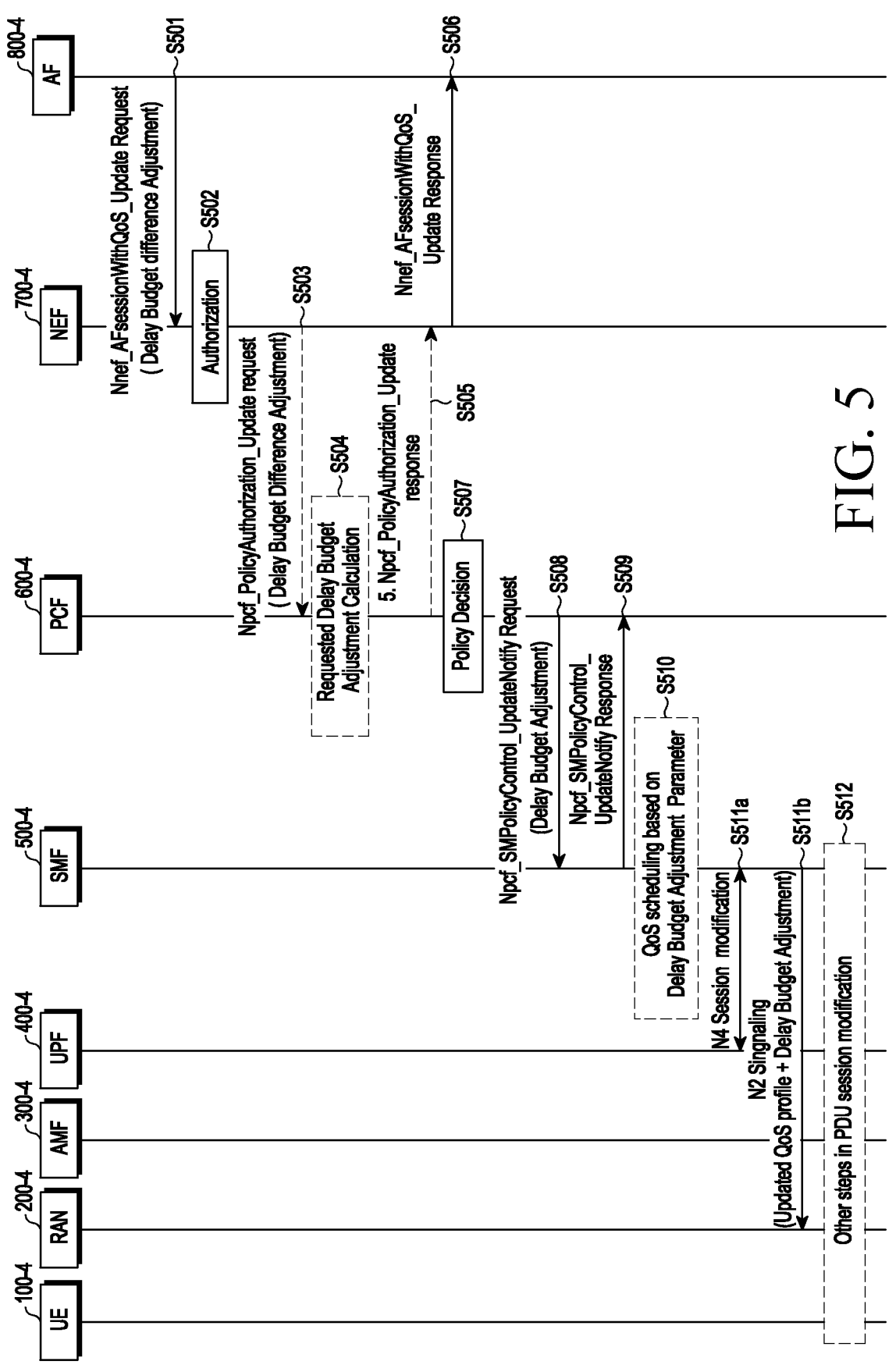

Tethered device transmission delay time value (delay budget adjustment) when multi-modality service using a tethered device is applied In an embodiment, in S311*b*, the SMF 500-1 may transfer, to the AMF 300-2, at least one of the QFI of service flow, AF ID, application ID, AF specific SF group ID (e.g., multi-modality service ID), and TSCAI including information such as tethered device transmission delay time value (delay budget adjustment) through an N1N2 message transfer (Namf_Communication_N1N2Message Transfer) service operation message. The AMF 300-2 may transfer the TSCAI and QFI, including information such as the tethered device transmission delay time value (delay budget adjustment) received from the SMF 500-2, to the RAN 200-2 using an N2 SM message. FIGS. 4 and 5 illustrate a method for transferring XR data for an XR service, which is a service using tethering, in a wireless communication system according to an embodiment. The embodiment of FIGS. 4 and 5 is a specific example in which XR service-related information is transferred from the AF/AS through the PCF to the UPF and NG-RAN and QoS for a service considering tethered device connection applies.

Although not shown in FIGS. 4 and 5, in step S400 before step S401 in FIG. 4 or step S500 before step S501 in FIG.

5, basic settings for using the XR service between the UE and the 5G system may be made. The UE for receiving the XR service may access the AF/AS providing the XR service and, in this case, the UE may access the AF/AS through the 5G system or Wi-Fi. Various communication schemes may be used for the UE to access the AF/AS. The XR service-related information using the multi-modality service-based tethered device according to the disclosure may include tethered transmission delay information including, e.g., a value of the tethering transmission delay time difference (delay budget difference adjustment) that occurs when data of each service flow is transferred to the UE and the tethered device connected to the UE and processed. Further, the UE ID, e.g., the SUPI or GPSI or AF-specific GPSI or UE IP address, may be included in the XR service-related information to identify the UE(s) corresponding to (belonging to) the AF specific SF group ID while providing the XR service-related information and the AF specific SF group ID (e.g., multi-modality service ID) from the AF/AS to the 5G system. The UE may transfer at least one of information about GPSI of the UE, application ID, IP address, service flow group ID, and tethered transmission delay information including delay budget difference adjustment to the DN (AS). The SMF may receive the PCC rule including the QoS and tethered delay information updated based on the tethered transmission delay information and transfer the updated QoS information to the UPF through, e.g., QER, based thereupon.

Referring to FIG. 4, in S401, the AF 800-3 may transfer, to the NEF 700-3, an AF session service operation generation (Nnef_AFsessionWithQoS_Create) or update (Nnef_AFsessionWithQoS_Update) request message including the per-service flow QoS requirement information considering the tethered device connection such as tethering transmission delay time information including, e.g., tethering transmission delay time difference (delay budget difference adjustment) and information (GPSI, application ID, AF specific group ID (e.g., multi-modality service ID)) for identifying the service flow(s) transmitted to the tethered device received in S400.

The NEF 700-3 may transfer, to the PCF 700-3, per-service flow QoS requirement information considering tethered device connection including transmission delay information and tethered device service flow ID information from the AF 800-3 through a policy authorization service generation (Npcf_PolicyAuthorization_Create) or update (Npcf_PolicyAuthorization_Update) request message through S402 and S403.

In S404, the PCF 600-3 may calculate the per-service flow transmission delay time (delay budget adjustment) transmitted to one or more tethered devices based on the tethered device ID information (GPSI, application ID, AF specific group ID (e.g., multi-modality service ID)) and the tethered device delay time information including the per-service flow transmission delay time difference-related information (delay budget difference adjustment) to be transmitted to the tethered device(s) in the service-related QoS requirement considering tethered device connection received from the AF 800-3. In an embodiment, when the service flow is bundled with a group ID (e.g., multi-modality service ID) of a separate application level, the delay time between service flows may be additionally considered to be utilized when calculating the per-service flow transmission delay time (delay budget adjustment) based on the tethered device transmission delay time received from the AF 800-3. In an embodiment, if no separate-related application level group ID is defined, the packet transmission delay time (delay budget adjustment) considering the per-service flow tethered transmission delay may be calculated based on the tethered device transmission delay time for each service flow.

In S405 and S406, the service-related update request-related response information considering the tethered device connection of the AF 800-3 received in S403 is transferred to the AF 800-3 through the NEF 700-3. In an embodiment, a reliable AF 800-3 may transfer tethered device connection service (e.g., XR service)-related QoS requirement information to the PCF 600-3 directly without passing through the NEF 700-3.

In S407, the PCF 600-3 may update the corresponding service flow-related default policy and charging control rule (PCC rule) based on tethered device connection service (e.g., XR service)-related QoS requirement information including the per-service flow tethered device transmission delay time (delay budget adjustment) to be transmitted to the tethered device(s). Basically, default policy and charging control rule (PCC rule) per service flow may be generated based on XR service-related information per XR service flow transmitted to the UE 100-3. The PCF 600-3 may determine to update QoS and update the PCC rule including, e.g., tethered transmission delay time information, based on the packet transmission delay time (PDB) value considering the tethered transmission delay, for the corresponding default policy and charging control rule.

Through S408, the PCF 600-3 may transfer, to the SMF 500-3, a session management policy control update notification (Npcf_SMPolicycontrol_UpdateNotify) service operation request message including the service-related per-service flow policy and charging control rule considering tethered device connection updated in S407 through the SM policy association modification process. In S409, the SMF 500-3 may transmit a session management policy control update notification (Npcf_SMPolicycontrol_UpdateNotify) service operation response message to the PCF 600-1.

In S410 (S410*a* and S410*b*), the SMF 500-3 may receive the per-service flow policy and charging control rule and service-related QoS requirement considering the tethered device connection received from the PCF 600-3, allocate a corresponding QFI to each service flow, and transfer service flow detection information and service-related information and/or forwarding information to the UPF 400-3 and RAN (or NG-RAN) 200-3 for each QFI. The forwarding information is information used in the process of transferring (forwarding) XR service flow data from each UPF 400-3 to the RAN 200-3.

The SMF 500-3 receiving the service flow detection information and the XR service-related information in S410*a* detects the ID of the QoS flow of the service flow based on the updated policy and charging control rule received in S408, and transfers information to be applied to the corresponding QoS flow to the UPF 400-3 through an N4 session establishment or modification process. Therefore, the information transferred to the UPF 400-3 may include, e.g., QoS flow ID (QFI) for the XR service flow and information for detecting the same, e.g., AF ID or application ID or AF/AS address information, i.e., IP address and port information or application level packet information, i.e., ADU ID or sequence number (SN). Further, the information transferred to the UPF 400-3 in S410*a* may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S410*b*, the SMF 500-3 may include at least one of the following information as the SM policy information in the N2 SM message container and transfer it to the RAN 200-3.

QFI of service flow,

AF ID,

Application ID,

AF specific SF Group ID,

Tethered device transmission delay time value (delay budget adjustment) when multi-modality service using tethered device is applied In an embodiment, in S410*b*, the SMF 500-3 may transfer, to the AMF 300-3, at least one of the QFI of service flow, AF ID, application ID, AF specific SF group ID (e.g., multi-modality service ID), and TSCAI including information such as tethered device transmission delay time value (delay budget adjustment) when a service using a tethered device is applied through an N1N2 message transfer (Namf_Communication_N1N2Message Transfer) service operation message.

In an embodiment, the AMF 300-3 may transfer the TSCAI and QFI, including information such as the tethered device transmission delay time value (delay budget adjustment) received from the SMF 500-3, to the RAN 200-3 using an N2 SM message.

Referring to FIG. 5, in S501, the AF 800-4 may transfer, to the NEF 700-4, an AF session service operation generation (Nnef_AFsessionWithQoS_Create) or update (Nnef_AFsessionWithQoS_Update) request message including the per-tethered device connection service (e.g., XR service) flow QoS requirement information such as tethering transmission delay time difference (delay budget difference adjustment) information and information (GPSI, application ID, AF specific group ID (e.g., multi-modality service ID)) for identifying the service flow(s) transmitted to the tethered device received in S500 (not shown). The NEF 700-4 may transfer, to the PCF 600-4, a policy authorization service generation (Npcf_PolicyAuthorization_Create) or update (Npcf_PolicyAuthorization_Update) request message, including the tethered device connection service (e.g., XR service) flow QoS requirement information received from the AF 800-4 including the tethered device service flow ID information and transmission delay information, through S502 and S503.

In S504, the PCF 600-4 may calculate the transmission delay time (delay budget adjustment) of service flow transmitted to one or more tethered devices based on the tethered device ID information (GPSI, application ID, AF specific group ID (e.g., multi-modality service ID)) and the per-service flow transmission delay time difference-related information (delay budget difference adjustment) to be transmitted to the tethered device(s) in the tethered device connection service (e.g., XR service)-related QoS requirement received from the AF 800-4.

In S505 and S506, the XR service-related update request-related response information of the AF received in S503 may be transferred to the AF 800-4 through the NEF 700-4. In an embodiment, a reliable AF 800-4 may transfer tethered device connection service (e.g., XR service)-related QoS requirement information to the PCF 600-4 directly without passing through the NEF 700-4.

In S507, the PCF 600-4 may determine QoS scheduling using the corresponding service flow-related default policy and charging control rule (PCC rule) and tethered device connection service (e.g., XR service)-related QoS requirement information including the per-service flow tethered device transmission delay time (delay budget adjustment) to be transmitted to the tethered device(s). Here, the default policy and charging control rule (PCC rule) is XR service-related policy information considering QoS characteristics (PDB) between the UPF and the UE under the assumption that the UE receives one or more service flows. If it is determined in S507 that the PCF 600-4 may meet the service requirement considering tethered device connection with the per-service flow default QoS information, it may be determined to update the PCC rule including the default QFI and QoS profile and additionally the per-service flow tethered device transmission delay information considering the tethered device.

Through S508, the PCF 600-4 transfers, to the SMF 500-4, QoS requirements related to the tethered device connection service (e.g., XR service) including the per-tethered device service flow transmission delay time information (delay budget adjustment) and the per-XR service-related default service flow policy and charging control rule, through a session management policy control update notification service operation (Npcf_SMPolicycontrol_UpdateNotify) request message, through the SM policy association modification process. In S509, the SMF 500-4 may transmit a session management policy control update notification (Npcf_SMPolicycontrol_UpdateNotify) service operation response message to the PCF 600-4.

Further, the PCF 600-4 may transfer information for detecting service flow(s), e.g., the above-described service flow detection information, by the UPF 400-4 and SMF 500-4, to the SMF 500-4. The service flow detection information may include at least one of, e.g., the AF ID or application ID or application server address information, e.g., IP address and port information, or application level packet information, e.g., the sequence number or ID of the application data unit (ADU).

In S510, the SMF 500-4 may receive the XR service-related default policy and charging control rule and XR service-related information including the tethering transmission delay time information and information (GPSI, application ID, AF specific group ID (e.g., multi-modality service ID)) for identifying the service flow(s) transmitted to the tethered device received in S508, update the corresponding service flow-related policy information (PCC rule) and perform QoS scheduling.

In S511 (S511a and S511b), the SMF 500-4 may receive the tethered device connection service (e.g., XR service)-related QoS requirement and default per-service flow policy and charging control rule received from the PCF 600-4, allocate a corresponding QFI to each service flow, and transfer service flow detection information and XR service-related information and/or forwarding information to the UPF 400-4 and RAN (or NG-RAN) 200-4 for each QFI. The forwarding information is information used in the process of transferring (forwarding) XR service flow data from each UPF 400-4 to the RAN 200-4.

The SMF 500-4 receiving the service flow detection information and the XR service-related information in S511a detects the ID of the QoS flow of the service flow based on the policy and charging control rule updated in S510, and transfers information to be applied to the corresponding QoS flow to the UPF 400-4 through an N4 session establishment or modification process. Therefore, the information transferred to the UPF 400-4 may include at least one of QoS flow ID (QFI) for the XR service flow and information for detecting the same, e.g., AF ID or application ID or AF/AS address information, i.e., IP address and port information or application level packet information, i.e., ADU ID or sequence number (SN). Further, the information transferred to the UPF 400-4 in S511a may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S511b, the SMF 500-4 may include at least one of the following information as the SM policy information in the N2 SM message container and transfer it to the RAN 200-4.

QFI of service flow,

AF ID,

Application ID,

AF specific SF Group ID,

Tethered device transmission delay time value (delay budget adjustment) when multi-modality service using a tethered device is applied In an embodiment, in S511b, the SMF 500-4 may transfer, to the AMF 300-4, at least one of the QFI of service flow, AF ID, application ID, AF specific SF group ID (e.g., multi-modality service ID), and information such as tethered device transmission delay time value (delay budget adjustment) when a multi-modality service using a tethered device is applied through an N1N2 message transfer (Namf_Communication_N1N2Message Transfer) service operation message.

In an embodiment, the SMF 500-4 may transfer the tethered device transmission delay time value (delay budget adjustment) to the RAN 200-4 using a separate container (e.g., TSCAI) according to the network operator's policy. In this case, the SMF 500-4 may receive operation and policy information for utilizing the corresponding separate container from the PCF 600-4 in S508. The AMF 300-4 may transfer the TSCAI and QFI, including information such as the tethered device transmission delay time value (delay budget adjustment) received from the SMF 500-4, to the RAN 200-4 using an N2 SM message.

Meanwhile, although the aspect in which the UE(s) processes downlink data while receiving an XR service is described in connection with each embodiment of the disclosure, it is also possible to meet an allowable delay difference such that a difference considering a transmission delay time between the UE and the tethered device connected to the UE, a difference between service flows, does not cause a sense of perception mismatch and QoS requirements in the same manner as processing downlink data by including information for processing uplink data in the forwarding data and the XR service-related information for the XR service.

FIGS. 6A, 6B, 7A, and 7B illustrate a method for transferring XR data for an XR service, which is a service using tethering, in a wireless communication system according to an embodiment. The example of FIGS. 6A, 6B, 7A, and 7B is a procedure in which a plurality of XR data for the same XR service is transferred within an allowable delay time considering the transmission delay time between the user's UE and at least one tethered device connected to one or more UEs from the AF/AS.

Referring to FIGS. 6 (6A and 6B) and 7 (7A and 7B), it is considered that an XR service is used through the user's UEs, i.e., UE1 100-5 and 100-7 and UE2 100-6 and 100-8. In the example of FIGS. 6 and 7, UE1 100-5 and 100-7 and UE2 100-6 and 100-8 each may include an XR device or may be UEs connected with an XR device. The example of FIGS. 6 and 7 may be applied in the same manner even when a plurality of XR devices are connected to one UE, as in the example of FIG. 1A.

Figure 6A:
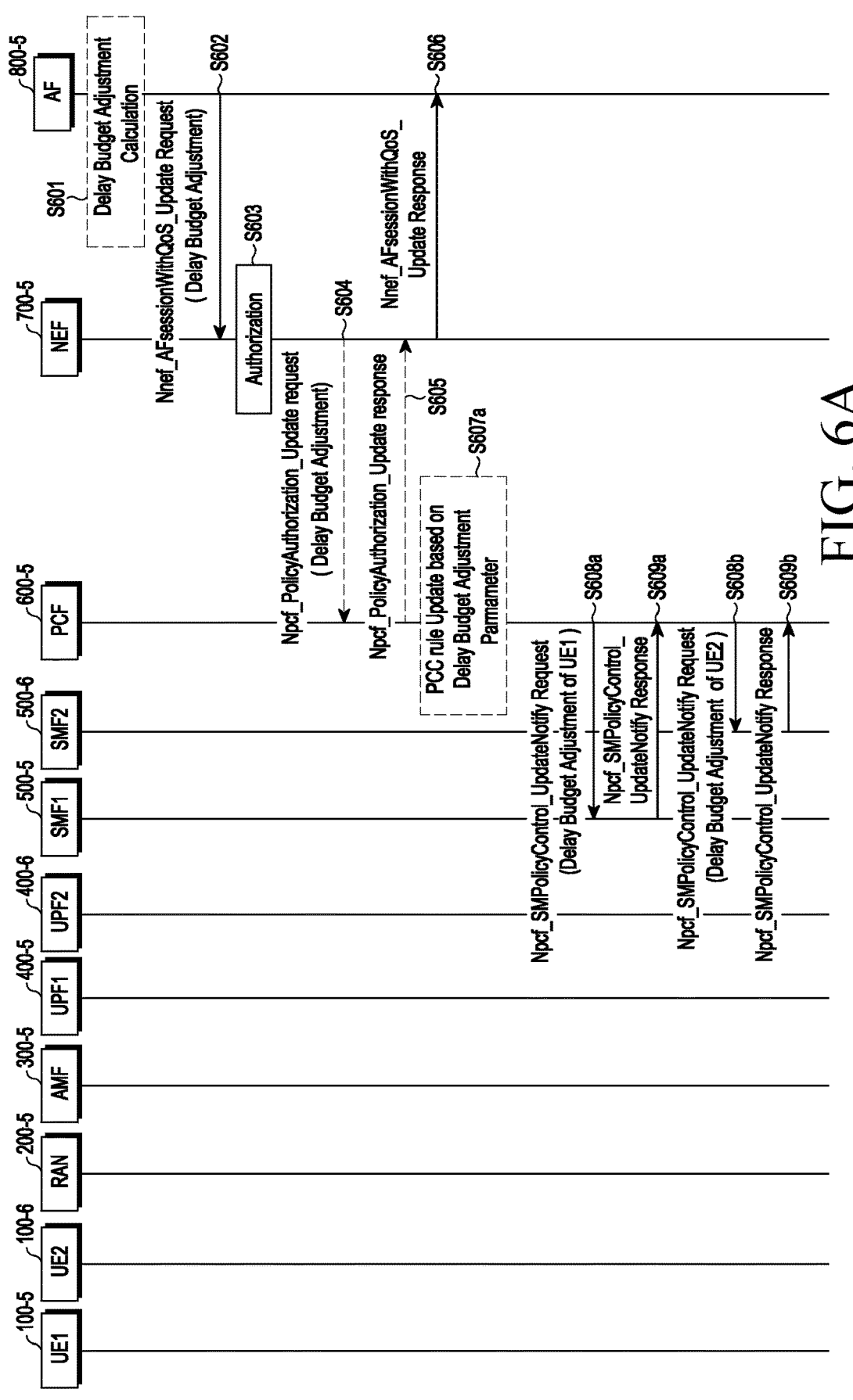
FIGS. 6A, 6B, 7A, and 7B illustrate a scheduling method for a multi-modality service of one or more UEs in a wireless communication system according to an embodiment.
Figure 6B:
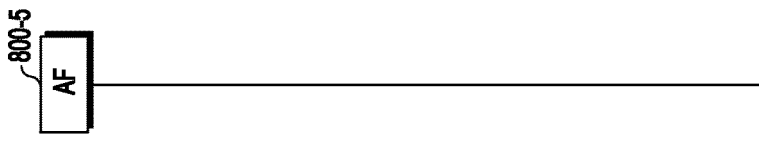
Figure 6B:
Figure 6B:
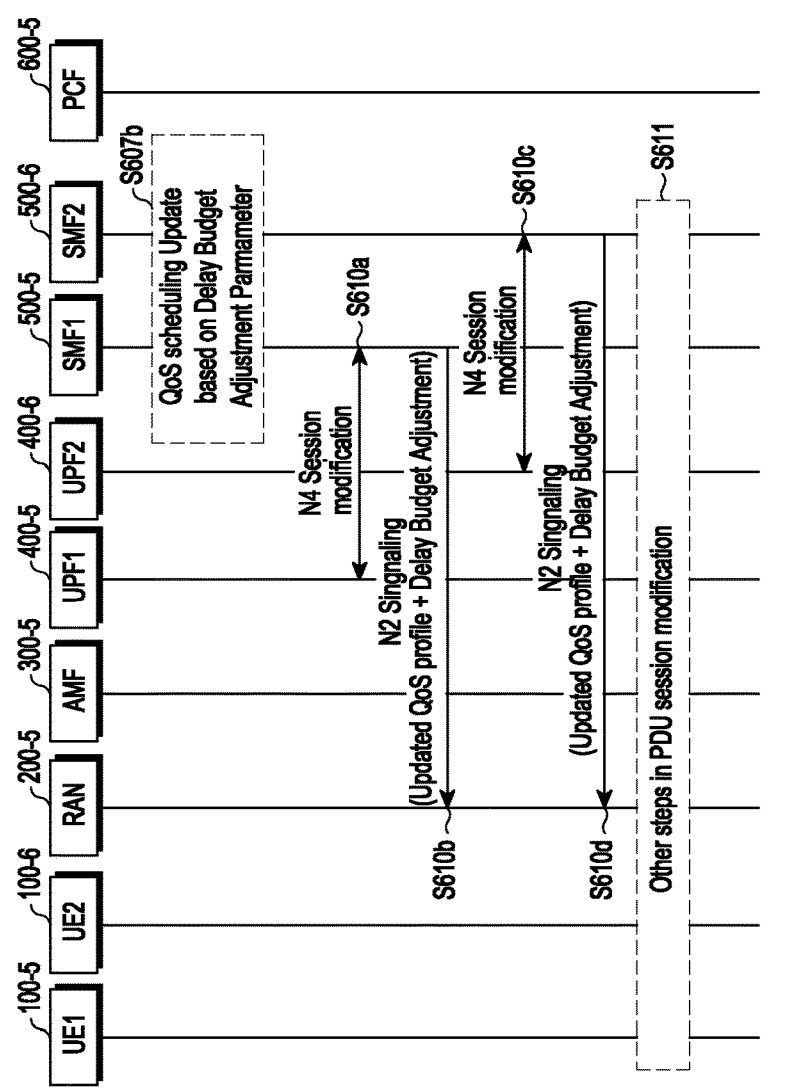
Figure 7A:
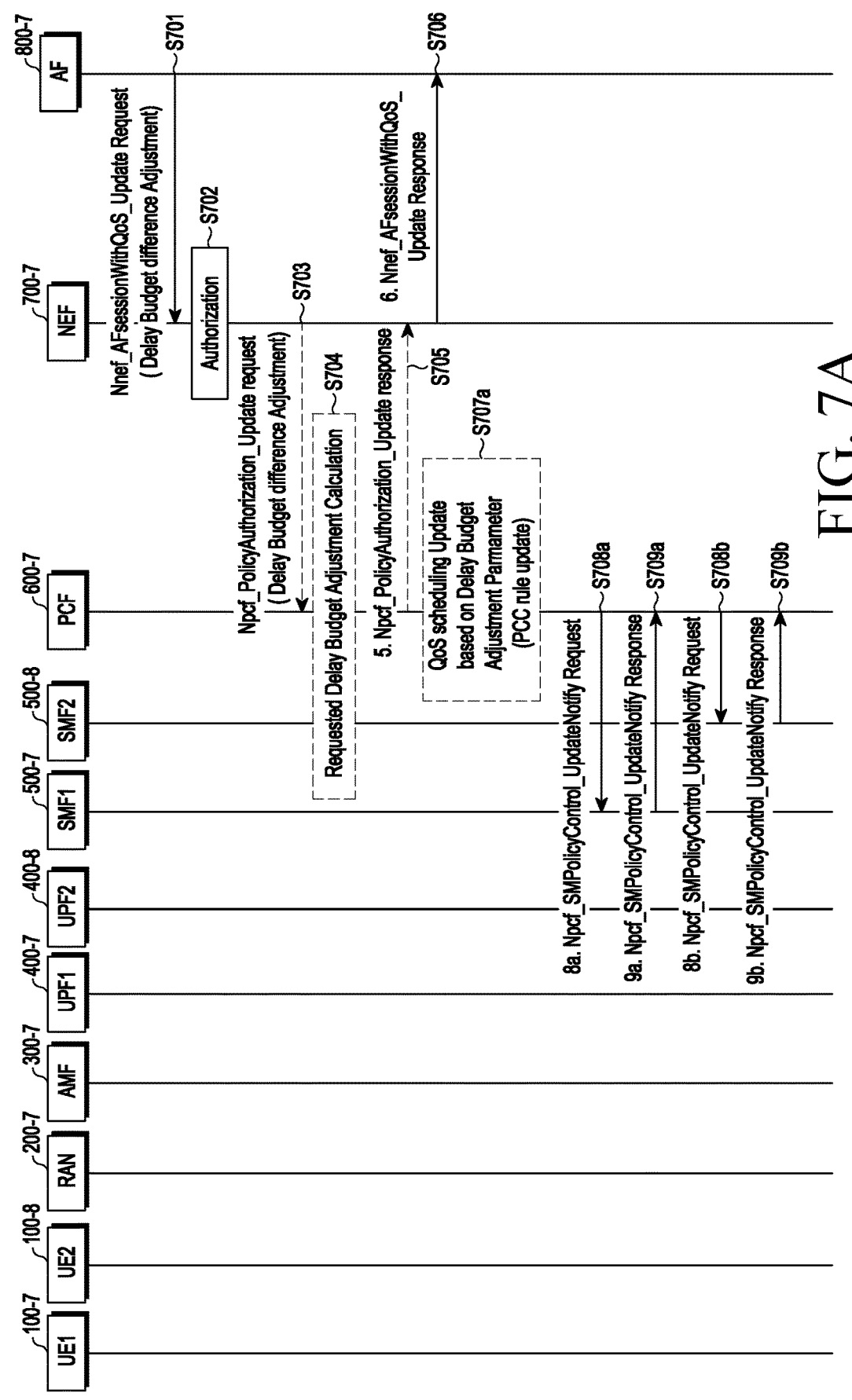

Although not shown in FIGS. 6A, 6B, 7A, and 7B, in S600 before S601 of FIG. 6A or S700 before S701 of FIG. 7A, a basic setting process for using an XR service may be performed between UE1 100-5 and 100-7, UE2 100-6 and 100-8 and the 5G system. The embodiment of FIGS. 6 and 7 is a specific example in which XR service-related information is transferred from the AF/AS through the PCF to the UPF and NG-RAN and QoS for multi-modality service applies. For example, it is assumed that an XR-dedicated S-NSSAI which is the identifier of the dedicated network slice for the XR service is configured in the UE and/or network. In this case, the XR dedicated S-NSSAI may include an SST for XR service or an SST for XR service provided by the communication operator. Additionally, the XR dedicated S-NSSAI may include a slice differentiator (SD) for identifying a specific XR service or a specific XR service application.

Further, the subscription information about the UE may (e.g., UE1 or UE2) include the XR-dedicated S-NSSAI corresponding to the XR service, which may be received by the UE through the network, or may include the AF/AS ID, which is the ID of the AF/AS providing the XR service to the UE or application ID and or the AF-specific GPSI or GPSI which is an ID for defining the UE by the AF/AS. Further, when a group of UEs (or XR devices) to together receive the XR service is predetermined, the AF specific SF group ID for defining the group or user ID or pairing information may be included in the subscription information. As such, when the subscription information includes the AF specific SF group ID (e.g., multi-modality service ID), the procedure for configuring the AF specific SF group between the AF/AS and the UE (e.g., UE1 or UE2) and the procedure for providing the 5G system with the AF specific SF group ID, which is information indicating the configured group, or user ID or pairing information may be omitted and, the information may be updated by the network.

UE1 and UE2 for receiving the XR service may access the AF/AS providing the XR service and, in this case, UE1 and UE2 may access the AF/AS through the 5G system or Wi-Fi. Various communication schemes may be used for UE1 and UE2 to access the AF/AS. UE1 and UE2 connected to the AF/AS may transfer information related to the XR device connected to the UE. The tethered XR device-related information may include delay time-related information for XR data transmission from the UE to the tethered device. To that end, each UE may measure actual delay time between the UE and the tethered device connected to the UE and transfer it the AF/AS or transfer information in the form of a tethering profile (connection type or codec information) of the tethered device connected to each UE to the AF/AS and, based thereupon, use the average delay value of the tethering profile defined by the XR service operator.

Further, for each UE, transmission delay time information between UE and tethered device may be fixedly set and used, or the transmission delay time between UE and tethered device may be measured periodically or aperiodically depending on the user's environment and the updated information may be transferred to the AF/AS. The UE may transfer at least one of the GPSI of the UE, application ID, IP address, service flow group ID, and delay budget difference adjustment to the DN (AS). The SMF may transfer updated QER to the UPF.

Referring to FIGS. 6A and 6B, in S601, the AF 800-5 may calculate the per-service flow transmission delay time (delay budget adjustment) transmitted to the tethered device for each UE (UE1 100-5 and UE2 100-6) based on the tethering transmission delay time difference (delay budget difference adjustment) information and information (GPSI, application ID, AF specific group ID (e.g., multi-modality service ID)) for identifying the service flow(s) transmitted to the tethered device transmitted to one or more UEs (UE1 100-5 and UE2 100-6) received in S600 (not shown). It may be expressed as service flow transmission delay time information about one or more tethered devices per UE depending on the numbers of one or more UEs (UE1 100-5 and UE2 100-6) and tethered devices connected to each UE calculated above. Thereafter, in S602, the AF 800-5 may transfer, to the NEF 700-5, an AF session service operation generation (Nnef_AFsessionWithQoS_Create) or update (Nnef_AFsession-WithQoS_Update) request message including the per-UE tethered device connection service (e.g., XR service) flow transmission delay time-related QoS requirement information and service flow ID information about the one or more UEs and one or more tethered devices of each UE.

Through S603 and S604, the NEF 700-5 transfers, to the PCF 600-5, a policy authorization service generation (Npcf_PolicyAuthorization_Create) or update (Npcf_PolicyAuthorization_Update) request message including the per-tethered device connection service (e.g., XR service) flow QoS requirement information including, e.g., transmission delay information for each tethered device service flow connected with UE1 100-5 and UE2 100-6 received from the AF 800-5. In S605 and S606, the XR service-related update request-related response information of the AF 800-5 received in S604 may be transferred to the AF 800-5 through the NEF 700-5.

In S607a, the PCF 600-5 may update the corresponding service flow-related policy and charging control rule (PCC rule) based on tethered device connection service (e.g., XR service)-related QoS requirement information including the per-service flow transmission delay time (delay budget adjustment) to be transmitted to the tethered device(s), for each UE (UE1 100-5 and UE2 100-6), received from the AF 800-5. Basically, in an environment where the tethered device connected to the UE is not considered, a per-service flow default policy and charging control rule may be generated based on the XR service-related QoS information for each XR service flow transmitted to the UE.

According to an embodiment, when policy is determined without performing the PCF 600-5 update operation of S607a, SMF1 500-5 or SMF2 500-6 may receive XR service-related default policy and charging control rule and XR service-related information including the tethering transmission delay time information and information (GPSI, application ID, AF specific group ID (e.g., multi-modality service ID)) for identifying the service flow(s) transmitted to the tethered device for each UE (UE1 100-5 and UE2 100-6), update the service flow-related policy information, and perform QoS scheduling (S607b). When operation S607b is performed by SMF1 500-5 and/or SMF2 500-6, operation S607b may be performed after operations S608 and S609 between the PCF 600-5 and SMF1 500-5 or SMF2 500-6 are performed. Operations S607a and S607b may be optionally performed.

Thereafter, in S608 (S608a and S608b), the XR service-related per-service flow policy and charging control rule updated in S607 is transferred to the SMF 500-5 or 500-6 through a session management policy control update notification service operation (Npcf_SMPolicycontrol_UpdateNotify) request message through an SM policy association modification process. In an embodiment, if each UE selects a different SMF when establishing a PDU session while the service user uses an XR service through one or more UEs, in steps 608a and 608b, UE1 100-5 and UE2 100-6 may transfer a session management policy control update notification service operation (Npcf_SMPolicycontrol_UpdateNotify) request message including the XR service per-service flow policy and charging control rule considering the tethered device to SMF1 500-5 and SMF2 500-6, respectively, through an SM policy association modification process. In S609 (S609a and S609b), SMF1 500-5 may transmit a session management policy control update notification (Npcf_SMPolicycontrol_UpdateNotify) service operation response message to the PCF 600-5.

In S610 (S610a to S610d), SMF1 and SMF2 may receive the policy and charging control rule updated based on the per-UE XR service-related QoS requirement information, allocate a corresponding QFI to each service flow, and transfer service flow detection information and XR service-related information and/or forwarding information for XR service to the UPFs 400-5 and 400-6 and the RAN (or NG-RAN) 200-5, for each QFI. The forwarding information is information used in the process of transferring (forwarding) XR service flow data from each UPF 400-5 and 400-6 to the RAN 200-5.

In an embodiment, in S607 (S607a or S607b), if QoS scheduling information considering per-UE service flow update request information received from the AF 800-5 may be mapped to a standardized or non-standardized 5QI, and updated policy and charging control rule information is received, each SMF 500-5 and 500-6 may allocate the corresponding QFI based on the updated PCC rule and, for each QFI, the service flow detection information and XR service-related information for XR service and/or forwarding information may be transferred to the UPFs 400-5 and 400-6 and the RAN 200-5.

SMF1 500-5 receiving the service flow detection information and the XR service-related information in S610a may detect the ID of the QoS flow to be applied to the PDU session for UE1 100-5 based on the updated policy and charging control rule received in S608a and transfer information to be applied to the QoS flow to UPF1 400-5 through an N4 session establishment or modification process. Therefore, the information transferred to the UPF 400-5 may include, e.g., QoS flow ID (QFI) for the XR service flow and information for detecting the same, e.g., AF ID or application ID or AF/AS address information, i.e., IP address and port information or application level packet information, i.e., ADU ID or a sequence number (SN). Further, the information transferred to the UPF 400-5 in S610a may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S610b, SMF1 500-5 may include, in the N2 SM message container, at least one of the tethered device transmission delay time value (delay budget adjustment) when a multi-modality service using tethered device is applied, the QFI of the service flow of UE1 100-5, AF ID, application ID, and AF specific SF group ID (e.g., multi-modality service ID) as SM policy information, and transfer it to the RAN 200-5.

In an embodiment, in S610b, the SMF 500-5 may transfer, to the AMF 300-5, at least one of the QFI of service flow of UE1 100-5, AF ID, application ID, AF specific SF group ID (e.g., multi-modality service ID), and TSCAI including the tethered device transmission delay time value (delay budget adjustment) when a multi-modality service using a tethered device is applied through an N1N2 message transfer (Namf_Communication_N1N2Message Transfer) service operation message.

The AMF 300-5 may transfer a separate container (e.g., TSCAI) and QFI, including information such as the tethered device transmission delay time value (delay budget adjustment) received from SMF1 500-5, to the RAN 200-5 using an N2 SM message. SMF1 500-5 may receive a device transmission delay time value (delay budget adjustment), operation of generating or modifying information in a container and related policy information for utilizing a separate container, from the PCF 600-5 through S608a.

SMF2 500-6 receiving the service flow detection information and the XR service-related information in S610c may detect the ID of the QoS flow to be applied to the PDU session for UE2 100-6 based on the updated policy and charging control rule received in S608b and transfer information to be applied to the QoS flow to UPF2 400-6 through an N4 session establishment or modification process. Therefore, the information transferred to the UPF 400-6 may include, e.g., QoS flow ID (QFI) for the XR service flow and information for detecting the same, e.g., AF ID or application ID or AF/AS address information, i.e., IP address and port information or application level packet information, i.e., ADU ID or a sequence number (SN). Further, the information transferred to the UPF 400-6 in S610c may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S610d, SMF2 500-6 may include, in the N2 SM message container, at least one of the tethered device transmission delay time value (delay budget adjustment) when a multi-modality service using tethered device is applied, the QFI of the service flow of UE2 100-6, AF ID, application ID, and AF specific SF group ID as SM policy information, and transfer it to the RAN 200-5.

In an embodiment, in S610d, SMF2 500-6 may transfer, to the AMF 300-5, at least one of the QFI of service flow of UE2 100-6, AF ID, application ID, AF specific SF group ID (e.g., multi-modality service ID), and a separate container (e.g., TSCAI) including the tethered device transmission delay time value (delay budget adjustment) when a multi-modality service using tethered device is applied through an N1N2 message transfer (Namf_Communication N1N2Message Transfer) service operation message.

The AMF 300-5 may transfer a separate container (e.g., TSCAI) and QFI, including information such as the tethered device transmission delay time value (delay budget adjustment) received from SMF2 500-6, to the RAN 200-5 using an N2 SM message. SMF2 500-6 may receive the tethered device transmission delay time value (delay budget adjustment), operation of generating or modifying information in container and related policy information for utilizing a separate container, from the PCF 600-5 through S608b.

Figure 7B:
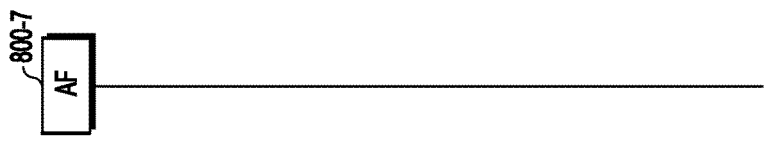
Figure 7B:
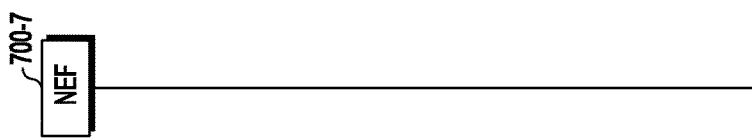
Figure 7B:
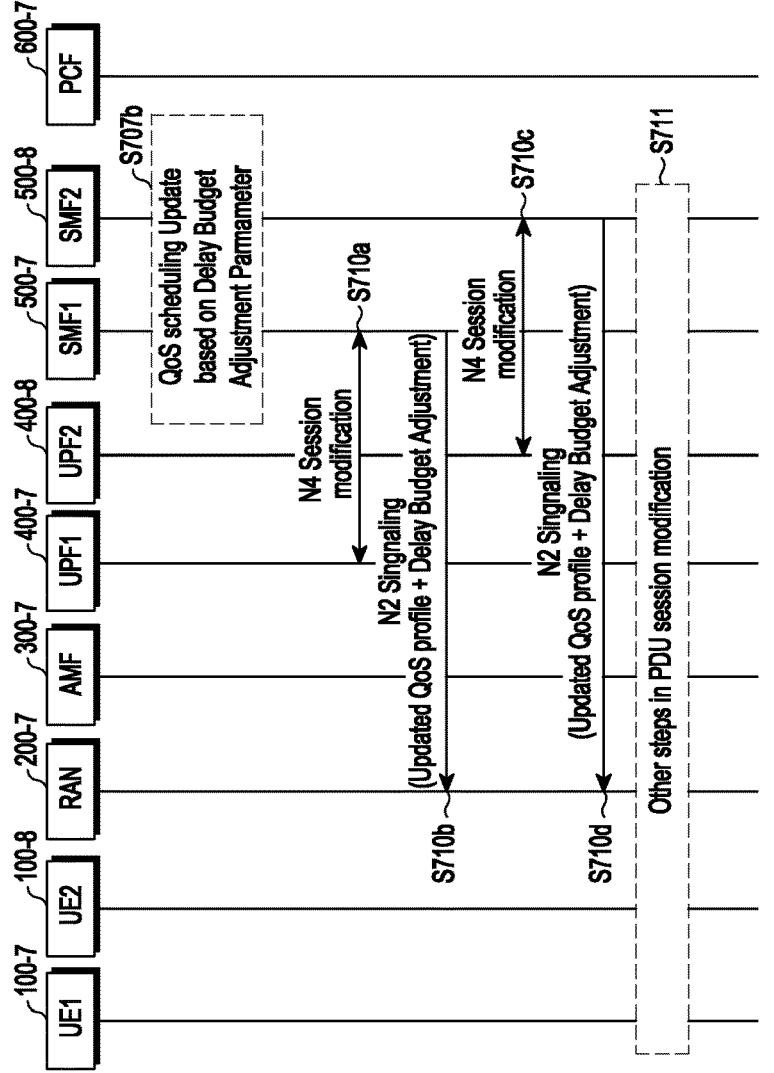

Referring to FIGS. 7A and 7B, in S701, the AF 800-7 may transfer, to the NEF 700-7, an AF session service operation generation (Nnef_AFsessionWithQoS_Create) or update (Nnef_AFsessionWithQoS_Update) request message including the tethering transmission delay time difference (delay budget difference adjustment) information and information (GPSI, application ID, AF specific group ID (e.g., multi-modality service ID)) for identifying the service flow (s) transmitted to the tethered device transmitted to UE1 100-7 and UE2 100-8 transferred in S700.

Thereafter, in S702 and S703, the NEF 700-7 may transfer, to the PCF 600-7, a policy authorization service generation (Npcf_PolicyAuthorization_Create) or update (Npcf_PolicyAuthorization_Update) request message including tethered device connection service (e.g., XR service) flow QoS requirement information, such as per-UE one or more tethered service flow transmission delay time difference information (delay budget difference adjustment) and information for identifying the service flow of one or more tethered devices of each UE and UE1 100-7 and UE2 100-8.

In S704, the PCF 600-7 may calculate the per-UE one or more tethered device service flow transmission delay time (delay budget adjustment) based on information (GPSI, application ID, AF specific group ID (e.g., multi-modality service ID) for identifying the service flow(s) transmitted to the tethered device and the tethering transmission delay time difference (delay budget difference adjustment) or per-service flow tethering transmission delay time, transmitted to UE1 100-7 and UE2 100-8.

In S705 and S706, the PCF 600-7 may transfer the XR service-related update request-related response information of the AF 800-7 received in S704 to the AF 800-7 through the NEF 700-7.

In S707 (S707a or S707b), the PCF 600-7 may update the corresponding service flow(s)-related policy and charging control rule (PCC rule) based on tethered device connection service (e.g., XR service)-related QoS requirement information including the transmission delay time (delay budget adjustment) of the service flow(s) to be transmitted to the tethered device(s), for each UE (UE1 100-7 and UE2 100-8), obtained through S704.

According to an embodiment, when policy is determined without performing the PCF 600-7 update operation of S707a, SMF1 500-7 or SMF2 500-8 may receive XR service-related default policy and charging control rule and XR service-related information including the tethering transmission delay time information and information (GPSI, application ID, AF specific group ID (e.g., multi-modality service ID)) for identifying the service flow(s) transmitted to the tethered device for each UE (UE1 100-5 and UE2 100-6), update the service flow-related policy information, and perform QoS scheduling, for each UE (UE1 100-7 and UE2 100-8) (S707b). In this case, the PCF 700-7 may transmit, to the SMF 500-7 and 500-8, information about per-UE one or more tethered device service flow transmission delay time (delay budget adjustment). When operation S707b is performed by SMF1 500-7 and/or SMF2 500-8, operation S707b may be performed after operations S708 and S709 between the PCF 600-7 and SMF1 500-7 or SMF2 500-8 are performed. Operations S707a and S707b may be optionally performed.

Thereafter, in S708 (S708a and S708b), the per-UE, per-service flow policy and charging control rule updated in S707 (S707a) may be transferred to the SMF 500-7 or 500-8 through a session management policy control update notification service operation (Npcf_SMPolicycontrol_UpdateNotify) request message through an SM policy association modification process. The request message may include information related to the transmission delay time (delay budget adjustment) of the service flow(s) to be transmitted to the tethered device(s) for each UE (UE1 100-7 and UE2 100-8).

In an embodiment, when the XR service user is using an XR service through different UEs, e.g., UE1 100-7 and UE2

100-8, as shown in FIG. 7 (FIGS. 7A and 7B) and each UE is managing a session through a different SMF (SMF1 500-7 and SMF2 500-8), it may be transferred to each SMF through a session management policy control update notification service operation (Npcf_SMPolicycontrol_UpdateNotify) request message including the policy and charging control rule of the service flows updated for each UE, through an SM policy association modification process in S708a and S708b. The PCF 600-7 may transfer information for detecting service flow(s), i.e., the above-described service flow detection information, by the UPF 400-7 and 400-8 and SMF 500-7 and 500-8, to the SMF 500-7 and 500-8. In S709 (S709a and S709b), SMF1 500-7 may transmit a session management policy control update notification (Npcf_SMPolicycontrol_UpdateNotify) service operation response message to the PCF 600-7.

In S710 (S710a to S710d), SMF1 500-7 and SMF2 500-8 may receive the policy and charging control rule updated based on the per-UE XR service-related QoS requirement information, allocate a corresponding QFI to each service flow, and transfer service flow detection information and XR service-related information and/or forwarding information for XR service to the UPFs 400-7 and 400-8 and the RAN (or NG-RAN) 200-7, for each QFI. The forwarding information is information used in the process of transferring (forwarding) XR service flow data from each UPF 400-7 and 400-8 to the RAN 200-7.

SMF1 500-7 receiving the service flow detection information and the XR service-related information in S710a detects the ID of the QoS flow to be applied to the PDU session for UE1 100-7 based on the updated policy and charging control rule received in S708a and transfers information to be applied to the QoS flow to UPF1 400-7 through an N4 session establishment or modification process. Therefore, the information transferred to the UPF 400-7 may include, e.g., QoS flow ID (QFI) for the XR service flow and information for detecting the same, e.g., AF ID or application ID or AF/AS address information, i.e., IP address and port information or application level packet information, i.e., ADU ID or sequence number (SN). Further, the information transferred to the UPF 400-7 in S710a may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S710b, SMF1 500-7 may include, in the N2 SM message container, information such as the tethered device transmission delay time value (delay budget adjustment) when a multi-modality service using tethered device is applied, the QFI of the service flow of UE1 100-7, AF ID, application ID, and AF specific SF group ID (e.g., multi-modality service ID) as SM policy information, and transfer it to the RAN 200-7.

In an embodiment, in S710b, SMF1 500-7 may transfer, to the AMF 300-7, at least one of the QFI of service flow of UE1 100-7, AF ID, application ID, AF specific SF group ID, and a separate container (e.g., TSCAI) including the tethered device transmission delay time value (delay budget adjustment) when a multi-modality service using tethered device is applied through an N1N2 message transfer (Namf_Communication_N1N2Message Transfer) service operation message.

The AMF 300-7 may transfer a separate container (e.g., TSCAI) and QFI, including information such as the tethered device transmission delay time value (delay budget adjustment) received from SMF1 500-7, to the RAN 200-7 using an N2 SM message.

SMF2 500-8 receiving the service flow detection information and the XR service-related information in S710c detects the ID of the QoS flow to be applied to the PDU session for UE2 100-8 based on the updated policy and charging control rule received in S708b and transfers information to be applied to the QoS flow to UPF2 400-8 through an N4 session establishment or modification process. Therefore, the information transferred to the UPF may include, e.g., QoS flow ID (QFI) for the XR service flow and information for detecting the same, e.g., AF ID or application ID or AF/AS address information, i.e., IP address and port information or application level packet information, i.e., ADU ID or sequence number (SN). Further, the information transferred to the UPF 400-8 in S710c may include an indicator indicating whether to apply multi-modality service to service flow, a difference value of the delay time allowed when the multi-modality service is applied, and information such as the tethering transmission delay time (delay budget adjustment) in the environment where tethered device connection is used.

Thereafter, in S710d, SMF2 500-8 may include, in the N2 SM message container, information such as the tethered device transmission delay time value (delay budget adjustment) when a multi-modality service using tethered device is applied, the QFI of the service flow of UE2 100-8, AF ID, application ID, and AF specific SF group ID as SM policy information, and transfer it to the RAN 200-7.

In an embodiment, in S710d, SMF2 500-8 may transfer, to the AMF 300-7, information such as the QFI of service flow of UE2 100-8, AF ID, application ID, AF specific SF group ID, and a separate container (e.g., TSCAI) including the tethered device transmission delay time value (delay budget adjustment) when a multi-modality service using tethered device is applied through an N1N2 message transfer (Namf_Communication_N1N2Message Transfer) service operation message.

The AMF 300-7 may transfer a separate container (e.g., TSCAI) and QFI, including information such as the tethered device transmission delay time value (delay budget adjustment) received from SMF2 500-8, to the RAN 200-7 using an N2 SM message.

Figure 8A:
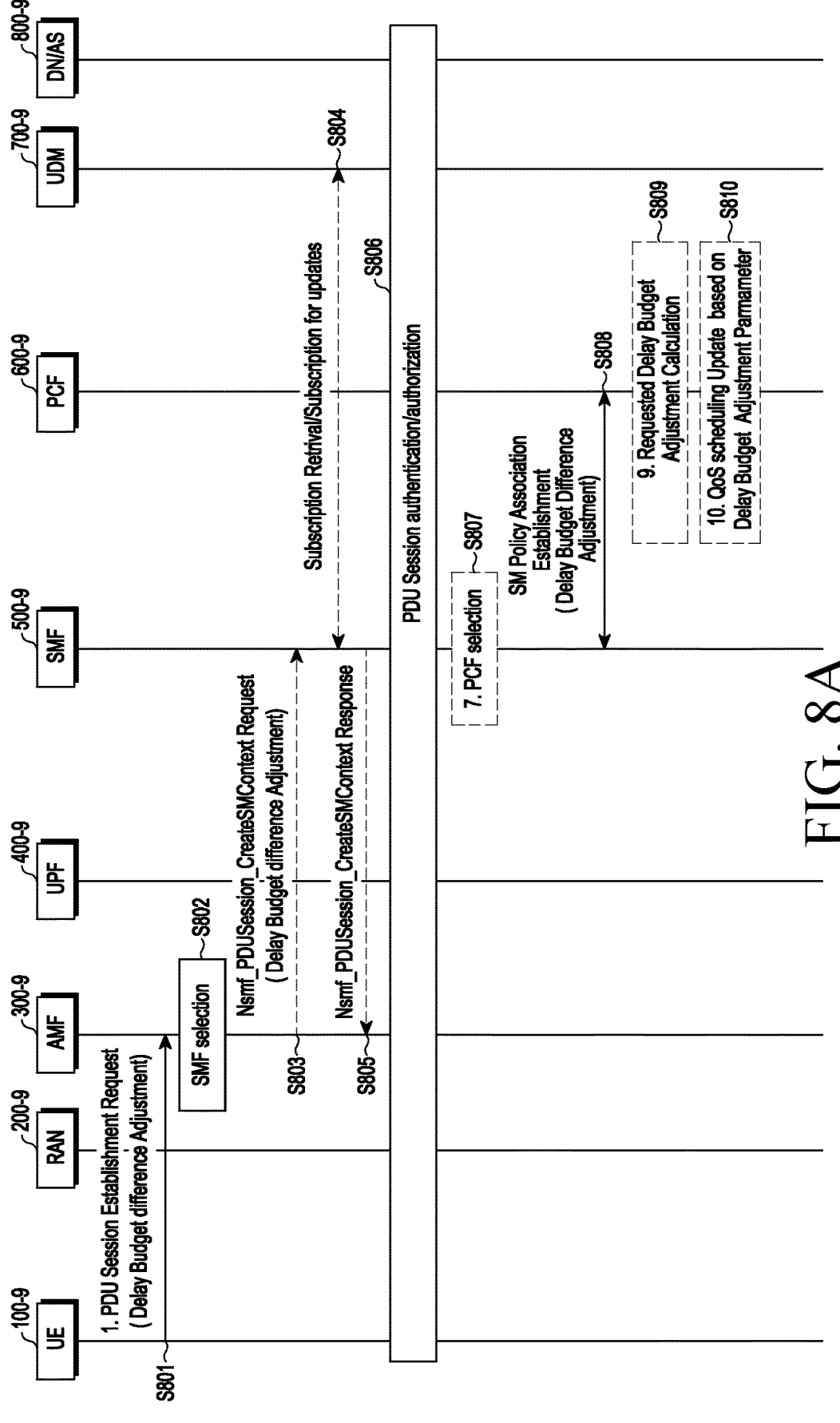
FIGS. 8A and 8B illustrate a session establishment procedure for a multi-modality service in a wireless communication system according to an embodiment.
Figure 8B:
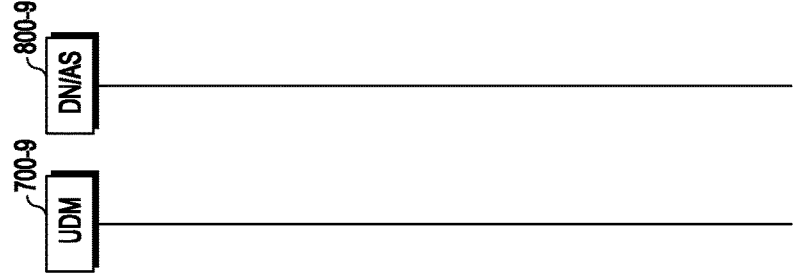
Figure 8B:
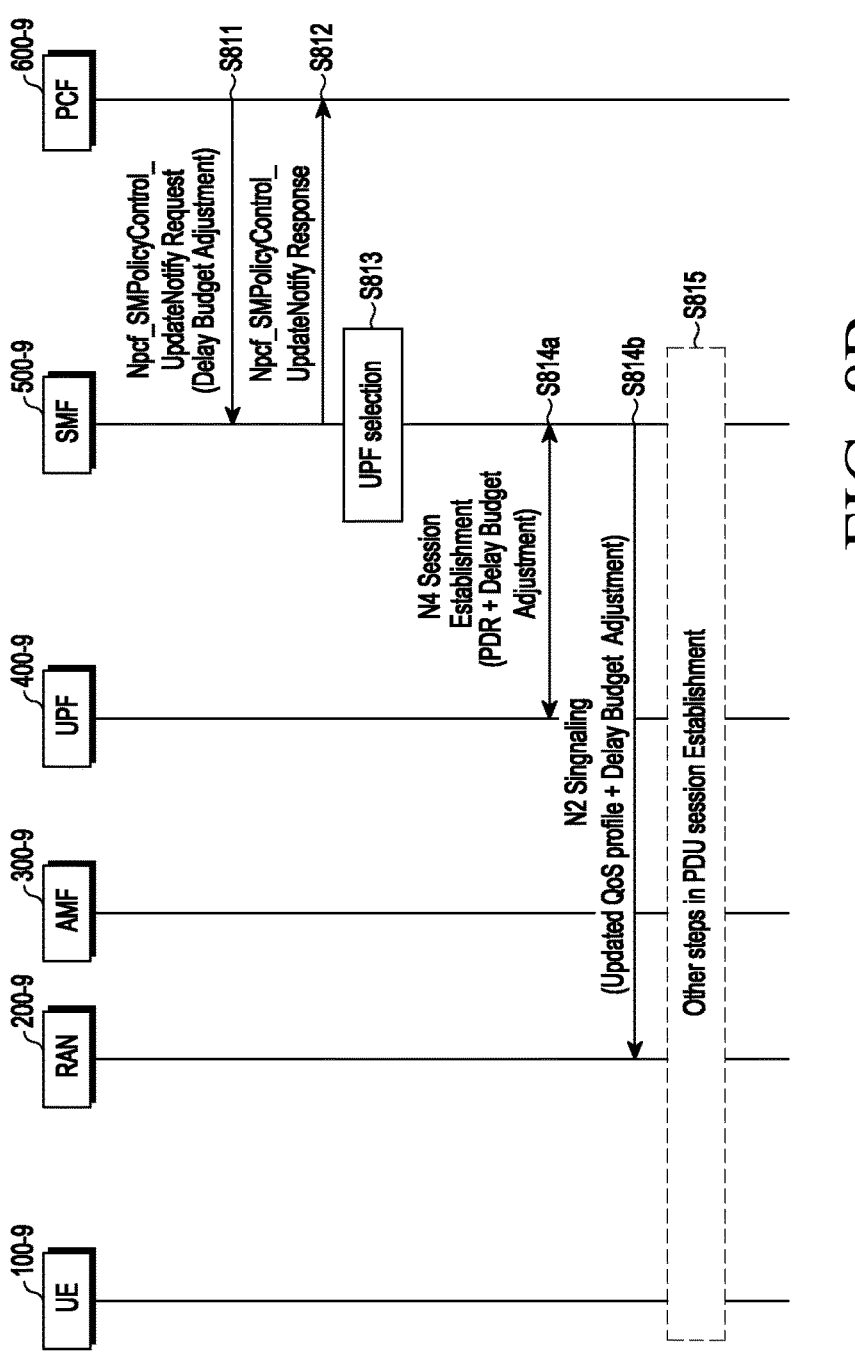

FIGS. 8A and 8B illustrate an example method for transferring XR data for an XR service, which is a service using tethering, in a wireless communication system according to an embodiment. In the example of FIG. 8 (FIGS. 8A and 8B), the UE used by the same user may be a UE including an XR device or connected to a tethered XR device. The example of FIG. 8 (FIGS. 8A and 8B) may be applied in the same manner even when a plurality of tethered XR devices are connected to one UE, as in the example of FIG. 1A.

The example of FIG. 8 (FIGS. 8A and 8B) is for a method for transferring a QoS requirement considering tethered device transmission for an XR service through the SMF 500-9 to the PCF 600-9 when the UE 100-9 performs a procedure for establishing a PDU session for the XR service. Further, the embodiment of FIG. 8 (FIGS. 8A and 8B) is for a method for seamlessly providing a multi-modality service by transferring XR service-related information for a multi-modality service for a QoS requirement for the UE's tethered device connection service (e.g., XR service) to the UPF 400-9 and the RAN 200-9 through the SMF 500-9.

Although not shown in FIG. 8 (FIGS. 8A and 8B), in S800 before S801 of FIG. 8A, basic settings for using the XR service between the UE 100-9 and the 5G system may be made. For example, it is assumed that an XR-dedicated S-NSSAI for the XR service is configured in the UE and/or network. In this case, the XR-dedicated S-NSSAI may include an SST for XR service as described above, or an SST for XR service provided by the communication carrier. Additionally, the XR dedicated S-NSSAI may include an SD for identifying a specific XR service or a specific XR service application.

Further, the subscription information about the UE configured in S800 may include the XR dedicated S-NSSAI corresponding to the XR service that may be received through the network by the UE or may include the AF/AS ID which is the ID of the AF/AS providing the XR service to be received by the UE and the AF-specific GPSI or GPSI which is the ID for defining the UE by the AF/AS, and the AF-specific group ID (e.g., multi-modality service ID) or user ID for defining the group of the UE together providing the XR service to the user may be included in the subscription information. In S800, the UE for receiving the XR service may access the AF/AS providing the XR service and, in this case, the UE may access the AF/AS through the 5G system or Wi-Fi. Various communication schemes may be used for the UE to access the AF/AS.

To identify the UE using the same XR service, the AF/AS may allocate/configure the same AF specific SF group ID (e.g., multi-modality service ID) to UE1 and UE2 through signaling with the UE. In this case, the AF specific SF group ID may be allocated to the group of the UEs receiving the same XR service, and be used to identify the group of the UEs or may also identify the group of service flows for providing XR data related to the same XR service to the group of the UEs.

Further, the pairing information about the UE receiving the same XR service or the email account of the user or the user ID managed by the application may be used instead of the AF specific SF group ID. In the disclosure, for convenience of description, embodiments of using the AF specific SF group ID are described. However, the disclosure is not limited to using the AF specific SF group ID to identify the group of UEs receiving the same XR service and/or the group of related service flows (SFs).

In S800, the AF/AS may provide the 5G system with the above-described XR service-related information to be applied to the service flows identified by the AF specific SF group ID. The XR service-related information provided by the AF/AS may be stored in the UDM or in the UDR through the UDM. The XR service-related information stored in the UDR may be transferred to the PCF to be used to perform QoS and/or scheduling for multi-modality service for the corresponding service flows in the 5G system. Further, when a multi-modality service is supported for one or more tethered devices connected to the UE according to the disclosure, value information (delay budget difference adjustment) about the tethering transmission delay time difference that occurs when data of the service flow is transferred/processed may be measured by the UE itself or may be requested/received from the AF/AS using profile information according to the tethering scheme.

Referring to FIGS. 8A and 8B, in S801, the UE 100-9, which is to receive an XR service, may include the XR dedicated S-NSSAI and data network name (DNN) even outside the N1 session management (SM) non-access stratum (NAS) container according to the 3GPP standard, along with the PDU session establishment request message in the process of performing the procedure of establishing a PDU session for an XR service. The N1 SM NAS container may include the PDU session establishment request message.

Further, the PDU session establishment request message may include the application ID or AF/AS ID which is information about the application providing the XR service and the AF specific SF group ID which is group information about the UEs used together in using the XR service obtained by the UE 100-9 in S800 and tethered devices connected thereto and transmission delay time difference information (delay budget difference adjustment) to the tethered device.

The AF specific SF group ID may be included even outside the N1 SM NAS container. As such, the reason for additionally including the AF specific SF group ID in the field outside the N1 SM NAS container is that the AMF 300-9 receiving the NAS message including the PDU session establishment request message may not identify information in the N1 SM NAS container. The UE 100-9 may include the XR dedicated S-NSSAI, DNN, application ID and/or AF/AS ID, and AF specific SF group ID in the fields outside the N1 SM container transferred to the AMF 300-9 through the PDU session establishment request message, notifying the AMF 300-9 of the XR dedicated S-NSSAI and DNN, application ID or AF ID and AF specific SF group ID to be used for the PDU session requested to be established.

Therefore, in S802, the AMF 300-9 receiving the NAS message (i.e., PDU session establishment request message) may send a request to the network slicing selection function (NSSF) and/or NRF based on the XR dedicated S-NSSAI and DNN and application ID or AF specific SF group ID received from the UE 100-9 or the network slice instance identifier (NSI ID) previously allocated, and select an SMF 500-9 appropriate for the XR service of the UE. For example, the AMF 300-9 may transfer information, such as the XR dedicated S-NSSAI and the UE's tracking area identifier (TAI) information, to the NSSF and receive information about the NRF present in the network slice instance appropriate for the XR service of the UE from the NSSF or receive the NSI ID and, based on the information received from the NSSF, transfer the XR dedicated S-NSSAI and DNN and application ID or AF specific SF group ID and NSI ID to the NRF, and in reply, receive an SMF instance appropriate for the XR service from the NRF and select it.

Further, in S802, when there is no dedicated SMF instance for the application ID or AF specific SF group ID, the AMF 300-9 may select an SMF based on the XR dedicated S-NSSAI and the DNN.

In S803, the AMF 300-9 may transfer (e.g., Nsmf_P-DUSession_CreateSMContext Request) a PDU session establishment request message including the transmission delay time difference information (delay budget difference adjustment) received from the UE to the selected SMF 500-9 and, in S808, the SMF 500-9 receiving the PDU session establishment request message may transmit, to the PCF 600-9, through an SM policy association establishment process, an Npcf_SMPolicyControl_Create request message including not only the SUPI, DNN, S-NSSAI, and PDU session ID but also the application ID or AF ID, AF specific group ID, AF specific GPSI and tethered device transmission delay information (delay budget difference adjustment). Thus, the SMF 500-9 may send a request for the XR service-related information to be applied to the AF specific SF group, which is information about the service flows and the UE to which the multi-modality service is to be applied in the XR service constituted of the UE and one or more tethered devices, to the PCF 600-9.

In S809, the PCF 600-9 may calculate the transmission delay time value (delay budget adjustment) of the tethered device service flow based on the XR service-related information including the UE ID information (AF specific SF group) and the tethered device transmission delay difference value (delay budget difference adjustment).

In S810, the PCF 600-9 may identify whether it has XR service-related information to be applied to the UE and, if the XR service-related information is present, update the XR service-related policy and charging control rule based on the XR service-related request information including the transmission delay time value (delay budget adjustment) of the tethered device service flow received in S809 in the XR service-related information.

In an embodiment, if the XR service-related information is absent, although not shown in FIG. 8 (FIGS. 8A and 8B), it may request and receive the XR service-related information to be applied to the AF specific SF group used for the AF ID or application ID from the UDR and update the XR service-related policy and charging control rule based on the XR service-related request information including the transmission delay time value (delay budget adjustment) of the tethered device service flow received in S809 with the received XR service-related information.

Further, the XR service-related information may further include at least one of information indicating whether application of the dedicated QoS flow to the service flow is required, information indicating whether dedicated queuing is required, information indicating whether to apply a multi-modality service to the service flow, a difference value of a delay time allowed when a multi-modality service is applied, a transmission delay time value or difference value when a multi-modality service is applied considering the tethered device. Further, the PCF 600-9 may transfer information for detecting service flow(s), i.e., the above-described service flow detection information, by the UPF 400-9 and SMF 500-9, to the SMF 500-9. The service flow detection information may include, e.g., the AF ID or application ID or application server address information, i.e., IP address and port information, or application level packet information, i.e., the sequence number or ID of the application data unit (ADU).

In S811, the SMF 500-9 receiving the service flow detection information and the XR service-related information through the SM policy modification process may select a new UPF (S813) if no UPF is allocated for the DNN, S-NSSAI, and application ID and AF specific SF group ID and, in S814a of FIG. 8B, detects the ID of the QoS flow to be applied to the PDU session requested to be established for the UE and transfers information to be applied to the corresponding QoS flow including the transmission delay time value (delay budget adjustment) of the tethered device service flow to the UPF 400-9 through an N4 session establishment or modification process. Therefore, the information transferred to the UPF 400-9 may include, e.g., QoS flow ID (QFI) for the XR service flow and information for detecting the same, e.g., AF ID or application ID or AF/AS address information, i.e., IP address and port information or application level packet information, i.e., ADU ID or a sequence number (SN). Further, the information transferred to the UPF 400-9 in S814a may include the indicator indicating whether to apply a multi-modality service to the service flow and delay time difference allowed when the multi-modality service is applied.

Thereafter, in S814b, the SMF 500-9 may include at least one of the following information as the SM policy information in the N2 SM message container and transmit it to the RAN (or NG-RAN) 200-9.

QFI for the XR service flow,

AF ID or Application ID

AF specific SF Group ID

A list of UE IDs (e.g., 5G globally unique temporary identifier) or 5G-S-temporary mobile subscriber identity (5G-S-TMSI)) allocated to UEs belonging to the AF specific SF group, An indicator indicating whether dedicated queuing with information about the QFIs serving the XR service flow by the UE is needed An indicator indicating whether multi-modality service is applied to service flow Difference value of delay time allowed when multi-modality service is applied, A transmission delay time value (delay budget adjustment) of tethered device service flow Therefore, the above-described XR service-related information may be provided to the RAN 200-9 through the path of AF/AS=>NEF=>PCF=>SMF=>NG-RAN.

In an embodiment, in S814*b*, the SMF 500-9 may transfer at least one of the following information to the AMF 300-9 through an N1N2 message transfer (Namf_Communication_N1N2Message Transfer) service operation message.

QFI for the XR service flow,

AF ID,

Application ID,

AF specific SF Group ID,

A list of UE IDs (e.g., 5G globally unique temporary identifier) or 5G-S-temporary mobile subscriber identity (5G-S-TMSI)) allocated to UEs belonging to the AF specific SF group, An indicator indicating whether dedicated queuing with information about the QFIs serving the XR service flow by the UE is needed An indicator indicating whether multi-modality service is applied to service flow and a difference value of delay time allowed when multi-modality service is applied, A transmission delay time value (delay budget adjustment) of tethered device service flow The AMF 300-9 may transfer a separate container (e.g., TSCAI) and QFI, including information such as the tethered device transmission delay time value (delay budget adjustment) received from the SMF 500-9, to the RAN 200-9 using an N2 SM message. Therefore, the above-described XR service-related information may be provided to the RAN 200-9 through the path of AF/AS=>NEF=>PCF=>SMF=>AMF=>NG-RAN.

Thereafter, in S814*a*, according to the N4 session message received by the UPF 400-9, the UPF 400-9 allocates a dedicated queue to the dedicated QFI and performs scheduling so that the difference value of the delay time required to forward or schedule the data packet of each XR dedicated QFI of the tethered device and the UE 100-9 is smaller than the difference value of the delay time allowed considering the tethered device transmission delay time. Further, according to the N2 SM message received by the RAN 200-9 in S814*b*, the NG-RAN allocates a dedicated queue to the dedicated QFI and performs scheduling so that the difference value of delay time required to forward or schedule the data packet of each XR dedicated QFI of the UE and the tethered device is smaller than the difference value of the delay time allowed considering the tethered device transmission delay time. Accordingly, the UE receiving the XR data may receive XR service data within the allowed delay time difference considering the delay time of the tethered device connected to the UE, smoothly supporting the multi-modality service to the user.

Figure 9:
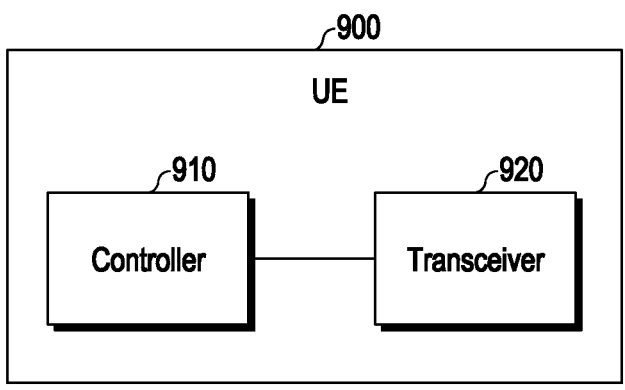
FIG. 9 illustrates a structure of a UE according to an embodiment.

FIG. 9 illustrates a structure of a UE 900 according to an embodiment. Referring to FIG. 9, according to an embodiment, a UE 900 may include at least one controller (or a processor) 910 and a transceiver 920 including a receiver and a transmitter. The UE 900 may include a memory (not shown). The transceiver 920 and the memory may be connected to the at least one controller 910 to be operated under the control of the at least one controller 910.

At least one controller 910 may control a series of processes so that the operations of the UE described in connection with FIGS. 1 to 8B of the disclosure may be performed. The transceiver 920 may transmit and receive signals to/from a base station or another network device (e.g., 1000). The signals may include control messages and data information.

Figure 10:
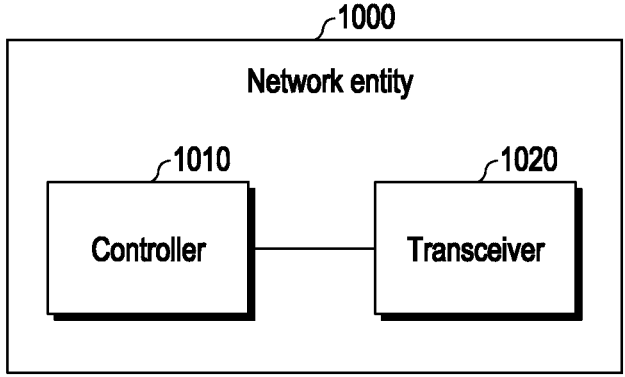
FIG. 10 illustrates a structure of a network entity according to an embodiment.

FIG. 10 illustrates a structure of a network entity 1000 according to an embodiment. The network entity 1000 may include the AF, AS, DN, NEF, PCF, SMF, UPF, AMF, RAN, UDM, or UDR of FIGS. 1 to 8. Referring to FIG. 10, the network entity 1000 of the disclosure may include at least one controller (or a processor) 1010 and a transceiver 1020 including a receiver and a transmitter. The network entity 1000 may include a memory (not shown). The transceiver 1020 and the memory may be connected to the at least one controller 1010 to be operated under the control of the at least one controller 1010.

At least one controller 1010 may control a series of processes so that the operations of the network entity described in connection with FIGS. 1 to 8B of the disclosure may be performed. The transceiver 1020 may transmit and receive signals to/from the UE 900 or another network entity. The signals may include control messages and data information.

It should be noted that the above-described configuration views, example views of control/data signal transmission methods, example views of operational procedures, and configuration views are not intended as limiting the scope of the disclosure. In other words, all the components, network entities, or operational steps described in connection with the embodiments should not be construed as essential components to practice the disclosure, and the disclosure may be rather implemented with only some of the components without departing from the gist of the disclosure. Further, the embodiments may be practiced in combination. For example, some of the methods proposed herein may be combined to operate the network entity and the UE.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

Although the present disclosure has been described with various embodiments, various changes and modifications may be suggested to one skilled in the art. It is intended that the present disclosure encompass such changes and modifications as fall within the scope of the appended claims.

US 12,684,404 B2

39

What is claimed is:

1. A session management function (SMF) entity in a wireless communication system, the SMF entity comprising:

a transceiver; and at least one processor, wherein the at least one processor is configured to:

receive, from a user equipment (UE) via an access and mobility management function (AMF) entity, a request for a packet data unit PDU) session including delay information indicating a delay between the UE and a non-3GPP (non-3rd generation partnership project) device, wherein the UE and the non-3GPP device communicate with each other; and transmit, to a radio access network (RAN) via the AMF entity, information on a quality of service (QoS) flow and information on a delay budget adjustment associated with the QoS flow, wherein the delay budget adjustment is related to the delay information received from the UE.

2. The SMF entity of claim 1, wherein the delay budget adjustment is related to a group identifier (ID) per service flow of a group including at least one non-3GPP device.

3. The SMF entity of claim 1, wherein the at least one processor is configured to include the information on the delay budget adjustment in time sensitive communication assistance information (TSCAI) and transmit, to the RAN, the TSCAI.

4. The SMF entity of claim 1, wherein the delay budget adjustment is related to at least one of information for distinguishing at least one service flow transmitted to the non-3GPP device and connection information for the non-3GPP device.

5. A method performed by a session management function (SMF) in a wireless communication system, the method comprising:

receiving, from user equipment (UE) via an access and mobility management function (AMF), a request for a packet data unit (PDU) session including delay information indicating a delay between the UE and a non-3GPP (non-3rd generation partnership project) device, wherein the UE and the non-3GPP device communicate with each other; and transmitting, to a radio access network (RAN) via the AMF entity, information on a quality of service (QoS) flow and information on a delay budget adjustment associated with the QoS flow, wherein the delay budget adjustment is related to the delay information received from the UE.

6. The method of claim 5, wherein the delay budget adjustment is related to a group identifier (ID) per service flow of a group including at least one non-3GPP device.

7. The method of claim 5, further comprising including the information on the delay budget adjustment in time sensitive communication assistance information (TSCAI) and transmitting, to the RAN, the TSCAI.

8. The method of claim 5, wherein the delay budget adjustment is related to at least one of information for distinguishing at least one service flow transmitted to the non-3GPP device and connection information for the non-3GPP device.

9. The method of claim 5, wherein the delay information is related to a data network name (DNN) and a single network slice selection assistance information (S-NSSAI) of the PDU session.

10. The SMF entity of claim 1, wherein the delay information is related to a data network name (DNN) and a single network slice selection assistance information (S-NSSAI) of the PDU session.

* * * * *